US012451076B2

(12) United States Patent
Cong et al.

(10) Patent No.: US 12,451,076 B2
(45) Date of Patent: Oct. 21, 2025

(54) PIXEL CIRCUIT AND DRIVING METHOD THEREFOR, DISPLAY PANEL, AND DISPLAY DEVICE

(71) Applicants: Beijing BOE Display Technology Co., Ltd., Beijing (CN); BOE Technology Group Co., Ltd., Beijing (CN)

(72) Inventors: Ning Cong, Beijing (CN); Can Zhang, Beijing (CN); Minghua Xuan, Beijing (CN); Jinfei Niu, Beijing (CN); Can Wang, Beijing (CN); Jingjing Zhang, Beijing (CN); Jiakui Yan, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/938,338

(22) Filed: Nov. 6, 2024

(65) Prior Publication Data

US 2025/0061846 A1 Feb. 20, 2025

Related U.S. Application Data

(63) Continuation of application No. PCT/CN2023/085048, filed on Mar. 30, 2023.

(30) Foreign Application Priority Data

Jul. 21, 2022 (WO) ................ PCT/CN2022/107194

(51) Int. Cl.
*G09G 3/32* (2016.01)
*G09G 3/3233* (2016.01)

(52) U.S. Cl.
CPC ............ *G09G 3/3233* (2013.01); *G09G 3/32* (2013.01); *G09G 2300/0842* (2013.01);
(Continued)

(58) Field of Classification Search
CPC .................. G09G 3/3233; G09G 3/32; G09G 2300/0842; G09G 2300/0852;
(Continued)

(56) References Cited

U.S. PATENT DOCUMENTS 12,106,691 B2 * 10/2024 Yamada .............. G09G 3/3233
2011/0164016 A1 7/2011 Kang et al.
(Continued)

FOREIGN PATENT DOCUMENTS

CN 107564473 A 1/2018
CN 108538245 A 9/2018
(Continued)

OTHER PUBLICATIONS

International Search Report and Written Opinion mailed on Jul. 26, 2021, received for PCT Application PCT/CN2020/126034, filed on Nov. 3, 2020, 17 pages including English Translation.
(Continued)

*Primary Examiner* — Andrew Sasinowski
(74) *Attorney, Agent, or Firm* — XSENSUS LLP

(57) ABSTRACT

A pixel circuit includes a driving circuit, a control circuit and a gating circuit. The driving circuit is configured to control, under control of a scan signal and a signal received at an enable signal control terminal, on and off of a current path for transmitting a driving current signal. The control circuit is configured to transmit, under control of a control signal received at a control signal terminal, a first enable signal received at a first enable signal terminal or a second enable signal received at a second enable signal terminal to a first node. The gating circuit is configured to transmit, in
(Continued)

1000 response to an enable signal received at the first node, a first constant voltage signal received at the first constant voltage signal terminal or a second constant voltage signal received at the second constant voltage signal terminal to the enable signal control terminal.

20 Claims, 22 Drawing Sheets

(52) U.S. Cl.
CPC ............... *G09G 2300/0852* (2013.01); *G09G 2300/0861* (2013.01); *G09G 2310/027* (2013.01); *G09G 2310/0286* (2013.01); *G09G 2310/062* (2013.01); *G09G 2310/08* (2013.01); *G09G 2320/0233* (2013.01); *G09G 2330/02* (2013.01); *G09G 2330/021* (2013.01)

(58) Field of Classification Search
CPC ..... G09G 2300/0861; G09G 2310/027; G09G 2310/0286; G09G 2310/062; G09G 2310/08; G09G 2320/0233; G09G 2330/02; G09G 2330/021; G09G 3/28
See application file for complete search history.

(56) References Cited

U.S. PATENT DOCUMENTS

| | | | | |
|---|---|---|---|---|
| 2014/0320544 | A1 | 10/2014 | Kim | |
| 2016/0063922 | A1 | 3/2016 | Tsai et al. | |
| 2018/0096651 | A1 | 4/2018 | Yamashita et al. | |
| 2018/0315374 | A1 | 11/2018 | Zhang et al. | |
| 2020/0265786 | A1 | 8/2020 | Li | |
| 2020/0273410 | A1 | 8/2020 | Yu et al. | |
| 2021/0167161 | A1 | 6/2021 | Yang et al. | |
| 2021/0366386 | A1 | 11/2021 | Gao | |
| 2022/0148493 | A1 | 5/2022 | Xuan et al. | |
| 2022/0157247 | A1 | 5/2022 | Yue et al. | |
| 2023/0186826 | A1* | 6/2023 | Hong | G01K 7/16 345/214 |
| 2023/0214037 | A1* | 7/2023 | Hwang | G06F 3/04184 345/174 |

FOREIGN PATENT DOCUMENTS

| | | | |
|---|---|---|---|
| CN | 109064972 | A | 12/2018 |
| CN | 109920371 | A | 6/2019 |
| CN | 110021264 | A | 7/2019 |
| CN | 110021273 | A | 7/2019 |
| CN | 110930930 | A | 3/2020 |
| CN | 111179849 | A | 5/2020 |
| CN | 111223444 | A | 6/2020 |
| CN | 111312158 | A | 6/2020 |
| CN | 111354314 | A | 6/2020 |
| CN | 111462679 | A | 7/2020 |
| CN | 111477162 | A | 7/2020 |
| CN | 111477163 | A | 7/2020 |
| CN | 111583873 | A | 8/2020 |
| CN | 111627387 | A | 9/2020 |
| CN | 112802431 | A | 5/2021 |
| CN | 113012634 | A | 6/2021 |
| CN | 113053301 | A | 6/2021 |
| CN | 113724653 | A | 11/2021 |
| CN | 114078441 | A | 2/2022 |
| KR | 20150083371 | A | 7/2015 |
| TW | 201944385 | A | 11/2019 |
| WO | 2022094738 | A1 | 5/2022 |

OTHER PUBLICATIONS

International Search Report and Written Opinion mailed on Dec. 29, 2022, received for PCT Application PCT/CN2022/107194, filed on Jul. 21, 2022, 20 pages including English Translation.

International Search Report and Written Opinion mailed on Jul. 11, 2023, received for PCT Application PCT/CN2023/085048, filed on Mar. 30, 2023, 17 pages including English Translation.

Notification to Grant Patent Right for Invention mailed May 12, 2023, in Chinese Application No. 202080002627.4, 6 pages including English translation.

Office Action mailed Jun. 14, 2022, in Taiwanese Application No. 110135545, 6 pages including English translation.

The First Office Action mailed Dec. 26, 2022, in Chinese Application No. 202080002627.4, 11 pages including English translation.

Ex Parte Quayle Action mailed Dec. 6, 2022, in U.S. Appl. No. 17/620,398, total 7 pages.

Ex Parte Quayle Action mailed Jan. 24, 2024, in U.S. Appl. No. 18/308,385, total 10 pages.

* cited by examiner

PIXEL CIRCUIT AND DRIVING METHOD THEREFOR, DISPLAY PANEL, AND DISPLAY DEVICE

CROSS-REFERENCE TO RELATED APPLICATIONS

This application is a bypass continuation application of International Patent Application No. PCT/CN2023/085048, filed on Mar. 30, 2023, which claims priority to International Patent Application No. PCT/CN2022/107194, filed on Jul. 21, 2022, each are incorporated herein by reference in their entirety.

TECHNICAL FIELD

The present disclosure relates to the field of display technologies, and in particular, to a pixel circuit and a driving method therefor, a display panel and a display device.

BACKGROUND

With advancement of display technologies, the technology of semiconductor elements, as a core of display devices, has been greatly improved. As current-type light-emitting devices, light-emitting diodes (LEDs) are increasingly used in high-performance display devices due to self-luminescence, fast response, wide viewing angle, and other properties.

Micro light-emitting diode display devices have high brightness and wide color gamut, which can meet the brightness and color gamut requirements of display devices using high-dynamic range (HDR) image technology, and are more suitable for realizing HDR displays.

SUMMARY

In an aspect, a pixel circuit is provided. The pixel circuit includes a driving circuit, a control circuit and a gating circuit. The driving circuit is coupled to a grayscale data signal terminal, a scan signal terminal, a first power supply voltage terminal, an enable signal control terminal and a light-emitting device. The driving circuit is configured to control on and off of a current path for transmitting a driving current signal under control of a scan signal received at the scan signal terminal and a signal received at the enable signal control terminal. The control circuit is coupled to a control signal terminal, a first node, a first enable signal terminal and a second enable signal terminal. The control circuit is configured to transmit a first enable signal received at the first enable signal terminal or a second enable signal received at the second enable signal terminal to the first node under control of a control signal received at the control signal terminal.

The gating circuit is coupled to the enable signal control terminal, the first node, a first constant voltage signal terminal and a second constant voltage signal terminal. The gating circuit is configured to, in response to an enable signal received at the first node, transmit a first constant voltage signal received at the first constant voltage signal terminal or a second constant voltage signal received at the second constant voltage signal terminal to the enable signal control terminal.

In some embodiments, the gating circuit includes a first output sub-circuit and a second output sub-circuit. The first output sub-circuit is coupled to the enable signal control terminal, the first node and the first constant voltage signal terminal. The first output sub-circuit is configured to, in response to the enable signal received at the first node, transmit the first constant voltage signal received at the first constant voltage signal terminal to the enable signal control terminal. The second output sub-circuit is coupled to the enable signal control terminal, the first node and the second constant voltage signal terminal. The second output sub-circuit is configured to, in response to the enable signal received at the first node, transmit the second constant voltage signal received at the second constant voltage signal terminal to the enable signal control terminal.

In some embodiments, the first output sub-circuit includes a first transistor. A first electrode of the first transistor is coupled to the first constant voltage signal terminal, a second electrode of the first transistor is coupled to the enable signal control terminal, and a control electrode of the first transistor is coupled to the first node. The second output sub-circuit includes a second transistor, and the second transistor has an inverse conduction type to the first transistor. A first electrode of the second transistor is coupled to the second constant voltage signal terminal, a second electrode of the second transistor is coupled to the enable signal control terminal, and a control electrode of the second transistor is coupled to the first node.

In some embodiments, the first constant voltage signal received at the first constant voltage signal terminal is greater than the second constant voltage signal received at the second constant voltage signal terminal. The first transistor is a P-type transistor, and the second transistor is an N-type transistor.

In some embodiments, the first constant voltage signal terminal is coupled to the first power supply voltage terminal, and the second constant voltage signal terminal is grounded.

In some embodiments, the driving circuit includes a data writing sub-circuit and a driving signal generation sub-circuit. The data writing sub-circuit is coupled to the grayscale data signal terminal, the scan signal terminal and a second node. The data writing sub-circuit is configured to transmit a grayscale data signal received at the grayscale data signal terminal to the second node in response to the scan signal received at the scan signal terminal. The driving signal generation sub-circuit is coupled to the second node, the first power supply voltage terminal, the enable signal control terminal and the light-emitting device. The driving signal generation sub-circuit is configured to generate the driving current signal based on a voltage at the second node and a first voltage signal received at the first power supply voltage terminal, and control the on and off of the current path for transmitting the driving current signal in response to the signal received at the enable signal control terminal.

In some embodiments, the driving signal generation sub-circuit includes a third transistor and a fourth transistor. A first electrode of the third transistor is coupled to a third node, a second electrode of the third transistor is coupled to a fourth node, and a control electrode of the third transistor is coupled to the second node. The fourth node is further coupled to a first electrode of the light-emitting device, and a second electrode of the light-emitting device is coupled to a second power supply voltage terminal. A first electrode of the fourth transistor is coupled to the first power supply voltage terminal, a second electrode of the fourth transistor is coupled to the third node, and a control electrode of the fourth transistor is coupled to the enable signal control terminal.

In some embodiments, the data writing sub-circuit is further coupled to a reference voltage terminal, and the scan signal terminal includes a first scan signal terminal and a second scan signal terminal. The data writing sub-circuit includes a fifth transistor, a sixth transistor and a first capacitor. A first electrode of the fifth transistor is coupled to the grayscale data signal terminal, a second electrode of the fifth transistor is coupled to the second node, and a control electrode of the fifth transistor is coupled to the first scan signal terminal. The sixth transistor has an inverse conduction type to the fifth transistor. A first electrode of the sixth transistor is coupled to the grayscale data signal terminal, a second electrode of the sixth transistor is coupled to the second node, and a control electrode of the sixth transistor is coupled to the second scan signal terminal. A first electrode plate of the first capacitor is coupled to the second node, and a second electrode plate of the first capacitor is coupled to a reference voltage terminal.

In some embodiments, the driving circuit further includes a reset sub-circuit. The reset sub-circuit is coupled to the scan signal terminal, a fourth node and a reset signal terminal. The reset sub-circuit is configured to, in response to the scan signal received at the scan signal terminal, transmit a reset signal received at the reset signal terminal to the fourth node.

In some embodiments, the reset sub-circuit includes a seventh transistor. A first electrode of the seventh transistor is coupled to the reset signal terminal, a second electrode of the seventh transistor is coupled to the fourth node, and a control electrode of the seventh transistor is coupled to the scan signal terminal.

In some embodiments, the data writing sub-circuit is further coupled to a reset signal terminal. The data writing sub-circuit includes an eighth transistor, a ninth transistor and a first capacitor. A first electrode of the eighth transistor is coupled to the grayscale data signal terminal, a second electrode of the eighth transistor is coupled to the second node, and a control electrode of the eighth transistor is coupled to the scan signal terminal. The ninth transistor has a same conduction type as the eighth transistor. A first electrode of the ninth transistor is coupled to the reset signal terminal, a second electrode of the ninth transistor is coupled to a fourth node, and a control electrode of the ninth transistor is coupled to the scan signal terminal. A first electrode plate of the first capacitor is coupled to the second node, and a second electrode plate of the first capacitor is coupled to the fourth node.

In some embodiments, the control circuit includes a first enable sub-circuit and a second enable sub-circuit. The first enable sub-circuit is coupled to a fifth node, the first enable signal terminal and the first node. The first enable sub-circuit is configured to transmit the first enable signal received at the first enable signal terminal to the first node in response to a signal received at the fifth node. The second enable sub-circuit is coupled to a sixth node, the second enable signal terminal and the first node. The second enable sub-circuit is configured to transmit the second enable signal received at the second enable signal terminal to the enable signal control terminal in response to a signal received at the sixth node.

In some embodiments, the first enable sub-circuit includes a tenth transistor. A first electrode of the tenth transistor is coupled to the first enable signal terminal, a second electrode of the tenth transistor is coupled to the first node, and a control electrode of the tenth transistor is coupled to the fifth node. The second enable sub-circuit includes an eleventh transistor. A first electrode of the eleventh transistor is coupled to the second enable signal terminal, a second electrode of the eleventh transistor is coupled to the first node, and a control electrode of the eleventh transistor is coupled to the sixth node.

In some embodiments, the control circuit further includes a first enable control sub-circuit and a storage sub-circuit. The first enable control sub-circuit is coupled to a control data signal terminal, the control signal terminal, the fifth node and the sixth node. The first enable control sub-circuit is configured to transmit a control data signal received at the control data signal terminal to the fifth node and the sixth node in response to the control signal received at the control signal terminal. The storage sub-circuit is coupled to a voltage signal terminal, the fifth node and the sixth node. The storage sub-circuit is configured to receive and store control data signals at the fifth node and the sixth node.

In some embodiments, transistors included in the first enable sub-circuit and the second enable sub-circuit have a same conduction type. The control signal terminal includes a first control signal terminal and a second control signal terminal; and the voltage signal terminal includes a first voltage signal terminal and a second voltage signal terminal.

The first enable control sub-circuit includes a first sub-circuit and a second sub-circuit. The first sub-circuit is coupled to the fifth node, the first control signal terminal and a first control data signal terminal. The first sub-circuit is configured to transmit a first control data signal received at the first control data signal terminal to the fifth node in response to a first control signal received at the first control signal terminal. The second sub-circuit is coupled to the sixth node, the second control signal terminal and a second control data signal terminal. The second sub-circuit is configured to transmit a second control data signal received at the second control data signal terminal to the sixth node in response to a second control signal received at the second control signal terminal.

The storage sub-circuit includes a first storage sub-circuit and a second storage sub-circuit. The first storage sub-circuit is coupled to the first voltage signal terminal and the fifth node. The first storage sub-circuit is configured to receive and store the first control data signal at the fifth node. The second storage sub-circuit is coupled to the second voltage signal terminal and the sixth node. The second storage sub-circuit is configured to receive and store the second control data signal at the sixth node.

In some embodiments, the first sub-circuit includes a twelfth transistor. A first electrode of the twelfth transistor is coupled to the first control data signal terminal, a second electrode of the twelfth transistor is coupled to the fifth node, and a control electrode of the twelfth transistor is coupled to the first control signal terminal. The second sub-circuit includes a thirteenth transistor. A first electrode of the thirteenth transistor is coupled to the second control data signal terminal, a second electrode of the thirteenth transistor is coupled to the sixth node, and a control electrode of the thirteenth transistor is coupled to the second control signal terminal.

The first storage sub-circuit includes a second capacitor. A first electrode plate of the second capacitor is coupled to the fifth node, and a second electrode plate of the second capacitor is coupled to the first voltage signal terminal. The second storage sub-circuit includes a third capacitor. A first electrode plate of the third capacitor is coupled to the sixth node, and a second electrode plate of the third capacitor is coupled to the second voltage signal terminal.

In some embodiments, transistors included in the first enable sub-circuit and the second enable sub-circuit have inverse conduction types. The first enable control sub-circuit includes a fourteenth transistor. A first electrode of the fourteenth transistor is coupled to a control data signal terminal, a second electrode of the fourteenth transistor is coupled to both the fifth node and the sixth node, and a control electrode of the fourteenth transistor is coupled to the control signal terminal. The storage sub-circuit includes a fourth capacitor. A first electrode plate of the fourth capacitor is coupled to the fifth node and the sixth node, and a second electrode plate of the fourth capacitor is coupled to the voltage signal terminal.

In some embodiments, the control circuit further includes a second enable control sub-circuit and a signal latch sub-circuit. The second enable control sub-circuit is coupled to a control data signal terminal, the control signal terminal and the sixth node. The second enable control sub-circuit is configured to transmit a control data signal received at the control data signal terminal to the sixth node in response to the control signal received at the control signal terminal. The signal latch sub-circuit is coupled to a third constant voltage terminal, a fourth constant voltage terminal, a fifth constant voltage terminal, the fifth node and the sixth node. The signal latch sub-circuit is configured to, in response to a voltage at the sixth node, transmit a fourth constant voltage signal received at the fourth constant voltage terminal or a fifth constant voltage signal received at the fifth constant voltage terminal to the fifth node.

In some embodiments, the second enable control sub-circuit includes a fifteenth transistor. A first electrode of the fifteenth transistor is coupled to the control data signal terminal, a second electrode of the fifteenth transistor is coupled to the sixth node, and a control electrode of the fifteenth transistor is coupled to the control signal terminal.

The signal latch sub-circuit includes a sixteenth transistor, a seventeenth transistor, an eighteenth transistor and a nineteenth transistor. A first electrode of the sixteenth transistor is coupled to the third constant voltage terminal, a second electrode of the sixteenth transistor is coupled to the sixth node, and a control electrode of the sixteenth transistor is coupled to the fifth node. The seventeenth transistor has an inverse conduction type to the sixteenth transistor. A first electrode of the seventeenth transistor is coupled to the sixth node, a second electrode of the seventeenth transistor is coupled to the fifth constant voltage terminal, and a control electrode of the seventeenth transistor is coupled to the fifth node. A first electrode of the eighteenth transistor is coupled to the fifth constant voltage terminal, a second electrode of the eighteenth transistor is coupled to the fifth node, and a control electrode of the eighteenth transistor is coupled to the sixth node. The nineteenth transistor has an inverse conduction type to the eighteenth transistor. A first electrode of the nineteenth transistor is coupled to the fourth constant voltage terminal, a second electrode of the nineteenth transistor is coupled to the fifth node, and a control electrode of the nineteenth transistor is coupled to the sixth node.

In some embodiments, transistors used in the pixel circuit are all silicon-based field effect transistors.

In another aspect, a display panel is provided. The display panel includes the pixel circuit as described in any of the above embodiments and a light-emitting device. The light-emitting device is coupled to the pixel circuit.

In some embodiments, the pixel circuit includes a first sub-circuit and a second sub-circuit. The first sub-circuit is coupled to a first control signal terminal and a first control data signal terminal, and the second sub-circuit is coupled to a second control signal terminal and a second control data signal terminal. The display panel further includes a plurality of first signal lines, a plurality of second signal lines, a plurality of third signal lines and a plurality of fourth signal lines.

First enable signal terminals of pixel circuits in a row are coupled to a first signal line in the plurality of first signal lines. Second enable signal terminals of pixel circuits in a row are coupled to a second signal line in the plurality of second signal lines. First control signal terminals and second control signal terminals of pixel circuits in a row are coupled to a same third signal line in the plurality of third signal lines, or the first control signal terminals and the second control signal terminals of the pixel circuits in the row are each coupled to a respective third signal line in the plurality of third signal lines. First control data signal terminals and second control data signal terminals of pixel circuits in a column are each coupled to a respective fourth signal line in the plurality of fourth signal lines.

In some embodiments, the pixel circuit includes a first sub-circuit and a second sub-circuit. The first sub-circuit is coupled to a first control signal terminal and a first control data signal terminal, and the second sub-circuit is coupled to a second control signal terminal and a second control data signal terminal. The display panel further includes a plurality of first signal lines, a plurality of second signal lines, a plurality of third signal lines and a plurality of fourth signal lines.

First enable signal terminals of pixel circuits in a row are coupled to a first signal line in the plurality of first signal lines. Second enable signal terminals of pixel circuits in a row are coupled to a second signal line in the plurality of second signal lines. First control signal terminals and second control signal terminals of pixel circuits in a row are each coupled to a respective third signal line in the plurality of third signal lines. First control data signal terminals and second control data signal terminals of pixel circuits in a column are coupled to a same fourth signal line in the plurality of fourth signal lines.

In some embodiments, the pixel circuit includes a second enable control sub-circuit, and the second enable control sub-circuit is coupled to a control data signal terminal and the control signal terminal. Alternatively, the pixel circuit includes a first enable control sub-circuit, a first enable sub-circuit and a second enable sub-circuit, the first enable control sub-circuit is coupled to the control data signal terminal and the control signal terminal, and transistors included in the first enable sub-circuit and the second enable sub-circuit have a same conduction type. The display panel further includes a plurality of first signal lines, a plurality of second signal lines, a plurality of third signal lines and a plurality of fourth signal lines.

First enable signal terminals of pixel circuits in a row are coupled to a first signal line in the plurality of first signal lines. Second enable signal terminals of pixel circuits in a row are coupled to a second signal line in the plurality of second signal lines. Control signal terminals of pixel circuits in a row are coupled to a third signal line in the plurality of third signal lines. Control data signal terminals of pixel circuits in a column are coupled to a same fourth signal line in the plurality of fourth signal lines.

In some embodiments, the display panel further includes a plurality of shift register circuits that are cascaded. Each shift register circuit is coupled to second enable signal terminals of pixel circuits in a row. The shift register circuit is configured to transmit the second enable signal to the second enable signal terminals of the pixel circuits couple thereto.

In yet another aspect, a display device is provided. The display device includes the display panel as described in any of the above embodiments and a driver chip. The driver chip is coupled to the display panel, and the driver chip is configured to provide signals to the display panel.

In yet another aspect, a driving method for a pixel circuit is provided. The pixel circuit includes the driving circuit, the control circuit and the gating circuit. The driving method for the pixel circuit includes:

in a light emission phase and in a case where a target grayscale of the light-emitting device driven by the pixel circuit is greater than a first grayscale, the control circuit transmitting the first enable signal to the first node; the gating circuit continuously transmitting the second constant voltage signal received at the second constant voltage signal terminal to the enable signal control terminal in response to the first enable signal received at the first node; and the driving circuit controlling the current path for transmitting the driving current signal to be on to drive the light-emitting device to continuously emit light in response to the second constant voltage signal received at the enable signal control terminal; and in the light emission phase and in a case where the target grayscale of the light-emitting device driven by the pixel circuit is less than or equal to the first grayscale, the control circuit transmitting the second enable signal to the first node; the gating circuit alternately transmitting the first constant voltage signal received at the first constant voltage signal terminal and the second constant voltage signal received at the second constant voltage signal terminal to the enable signal control terminal in response to the second enable signal received at the first node; and the driving circuit controlling the current path for transmitting the driving current signal to be off in response to the first constant voltage signal received at the enable signal control terminal, and controlling the current path for transmitting the driving current signal to be on in response to the second constant voltage signal received at the enable signal control terminal, so as to drive the light-emitting device to emit light intermittently.

In some embodiments, a duty cycle of the second enable signal is in a range of 0.2% to 100%, inclusive.

In yet another aspect, a computer-readable storage medium is provided. The computer-readable storage medium has stored computer program instructions thereon that, when run on a processor, enable the processor to perform one or more steps of the driving method for the pixel circuit in any of the above embodiments.

In yet another aspect, a computer program product is provided. The computer program product includes computer program instructions that, when executed by a computer, enable the computer to perform one or more steps of the driving method for the pixel circuit in any of the above embodiments.

In yet another aspect, a computer program is provided. The computer program, when executed by a computer, enables the computer to perform one or more steps of the driving method for the pixel circuit in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Figure 1:
FIG. 1 is a structural diagram of a display device, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. The term "connection" should be understood in a broad sense. For example, the "connection" may be a fixed connection, a detachable connection, or of an integrated structure; it may be a direct connection or an indirect connection by an intermediate medium. The term "coupled" indicates, for example, that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "equal" includes absolute equality and approximate equality, and an acceptable range of deviation of the approximate equality may be a difference between two equals being less than or equal to 5% of either of the two equals.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plane views as idealized exemplary drawings. In the accompanying drawings, thicknesses of layers and sizes of areas/regions are enlarged for clarity. Variations in shapes relative to the accompanying drawings due to, for example, manufacturing technologies and/or tolerances may be envisaged. Therefore, the exemplary embodiments should not be construed to be limited to the shapes of areas/regions shown herein, but to include deviations in the shapes due to, for example, manufacturing. For example, an etched area/region shown in a rectangular shape generally has a feature of being curved. Therefore, the areas/regions shown in the accompanying drawings are schematic in nature, and their shapes are not intended to show actual shapes of the areas/regions in a device, and are not intended to limit the scope of the exemplary embodiments.

In each thin transistor adopted in the pixel circuit, a control electrode of the thin transistor is a gate of the transistor, a first electrode of the thin transistor is one of a source and a drain of the thin transistor, and a second electrode of the thin transistor is another of the source and the drain of the thin transistor. Since the source and the drain of the thin transistor may be symmetrical in structure, the source and the drain may be structurally indistinguishable. That is, the first electrode and the second electrode of the thin transistor provided in the embodiments of the present disclosure may be indistinguishable in structure. For example, in a case where the thin transistor is a P-type transistor, the first electrode of the thin transistor is the source and the second electrode of the thin transistor is the drain. For example, in a case where the transistor is an N-type transistor, the first electrode of the transistor is the drain, and the second electrode of the transistor is the source.

In addition, in the pixel circuit provided in the embodiments of the present disclosure, the thin transistors may adopt N-type transistors or P-type transistors, one of which will be described in details in the present disclosure. It will be noted that the embodiments in the present disclosure include but are not limited thereto, as long as electrodes of the selected type of thin film transistor is coupled correspondingly with reference to the electrodes of corresponding thin film transistor in embodiments of the present disclosure, and the corresponding voltage terminals are made to provide corresponding high-level voltages or low-level voltages.

In the pixel circuit provided in the embodiments of the present disclosure, a capacitor may be a capacitor device manufactured separately through a process. For example, the capacitor device is realized by manufacturing specialized capacitor electrodes, and each capacitor electrode of the capacitor may be implemented by a metal layer, a semiconductor layer (e.g., doped polysilicon), or the like. The capacitor may alternatively be a parasitic capacitor between transistors, or implemented by the transistors and other devices or by the transistors and lines, or implemented by using the parasitic capacitor between lines of the circuit itself.

In the pixel circuit provided in the embodiments of the present disclosure, nodes such as a first node and a second node do not represent actual components, but represent junctions of related couplings in a circuit diagram. That is, these nodes are nodes equivalent to the junctions of the related couplings in the circuit diagram.

In the embodiments of the present disclosure, the term "high level" refers to a potential at a node, a connecting line terminal or an output terminal in a circuit, and the potential may at least drive each transistor to be turned on or off. For example, the high level may be 3.3 V or 5 V. For example, a gate of a P-type transistor is at a high level, a voltage between a source and the gate of the P-type transistor is greater than a threshold voltage thereof, and the P-type transistor is in a turn-off state. Alternatively, a gate of an N-type transistor is at a high level, a voltage between a source and the gate of the N-type transistor is greater than its threshold voltage, and the N-type transistor is in a turn-on state.

In the embodiments of the present disclosure, the term "low level" refers to a potential at a node, a connecting line terminal or an output terminal in a circuit, and the potential may at least drive each transistor to be turned on or off. For example, the low level may be 0 V. For example, a gate of a P-type transistor is at a low level, a voltage between the gate and a source of the P-type transistor is less than a threshold voltage thereof, and the P-type transistor is in a turn-on state. Alternatively, a gate of an N-type transistor is at a low level, a voltage between the gate and a source of the N-type transistor is less than its threshold voltage, and the N-type transistor is in a turn-off state.

Figure 2:
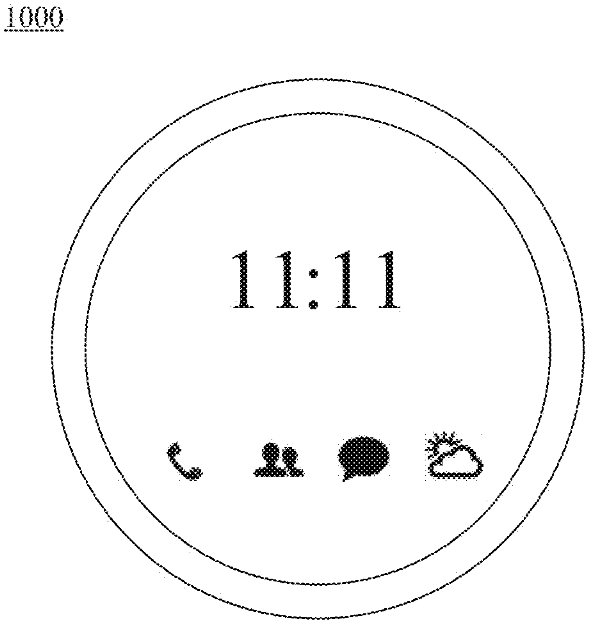
FIG. 2 is a structural diagram of another display device, in accordance with some embodiments.

As shown in FIGS. 1 and 2, some embodiments of the present disclosure provide a display device 1000. The display device 1000 may be any device that displays images whether in motion (such as a video) or fixed (such as a still image), and regardless of text or image.

For example, referring to FIGS. 1 and 2, the display device 1000 may be any product or component having a display function, such as a television, a notebook computer, a tablet computer, a mobile phone, a personal digital assistant (PDA), a navigator, a wearable device or a virtual reality (VR) device.

For example, as shown in FIG. 1, the display device 1000 may be a portable display product; for example, the display device 1000 may be a mobile phone shown in FIG. 1. As another example, referring to FIG. 2, the display device 1000 may be a wearable device; for example, the display device 1000 may be a circular watch shown in FIG. 2.

Some embodiments of the present disclosure will be exemplarily described below by taking an example in which the display device 1000 is a mobile phone shown in FIG. 1, but the embodiments of the present disclosure are not limited thereto.

Figure 3:
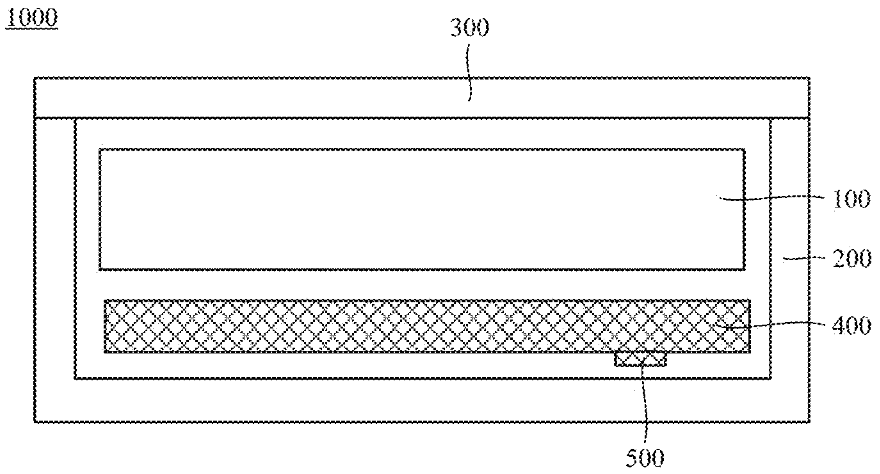
FIG. 3 is a cross-sectional view taken along a section line A-A' in FIG. 1.

In some embodiments, referring to FIG. 3, the display device 1000 includes a display panel 100.

For example, as shown in FIG. 3, the display device 1000 further includes a frame 200, a cover glass 300, a circuit board 400, a driver chip 500 and other electronic components.

The frame 200 has a U-shaped longitudinal section, the cover glass 300 is disposed on an opening side of the frame 200, and the display panel 100 is disposed in the frame 200. The circuit board 400 is disposed on a side of the display panel 100 away from the cover glass 300, and the driver chip 500 may be, for example, disposed on the circuit board 400 and coupled with the display panel 100. The driver chip 500 is configured to provide signals to the display panel 100.

Figure 4A:
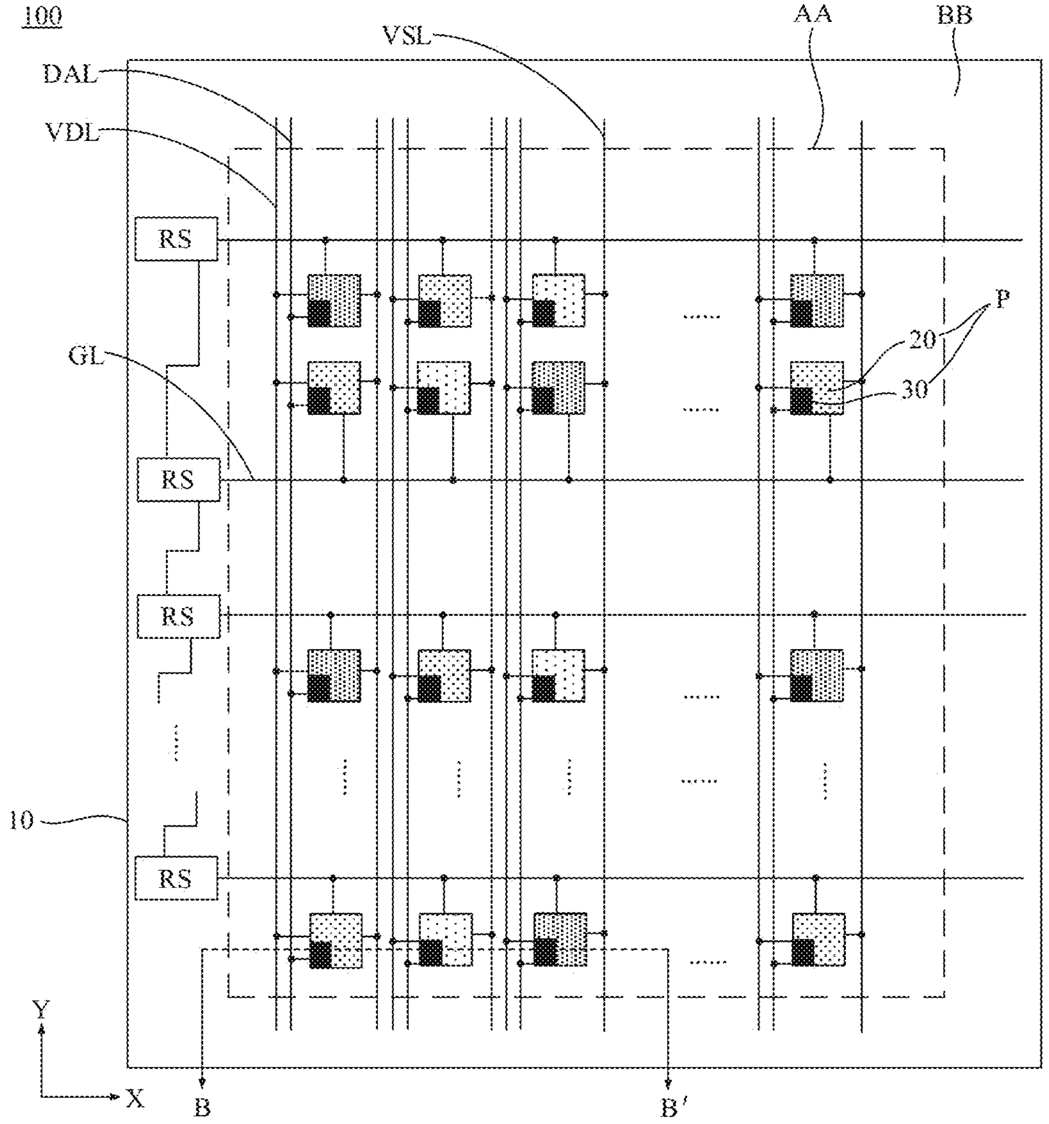
FIG. 4A is a structural diagram of a display panel, in accordance with some embodiments.
Figure 4B:
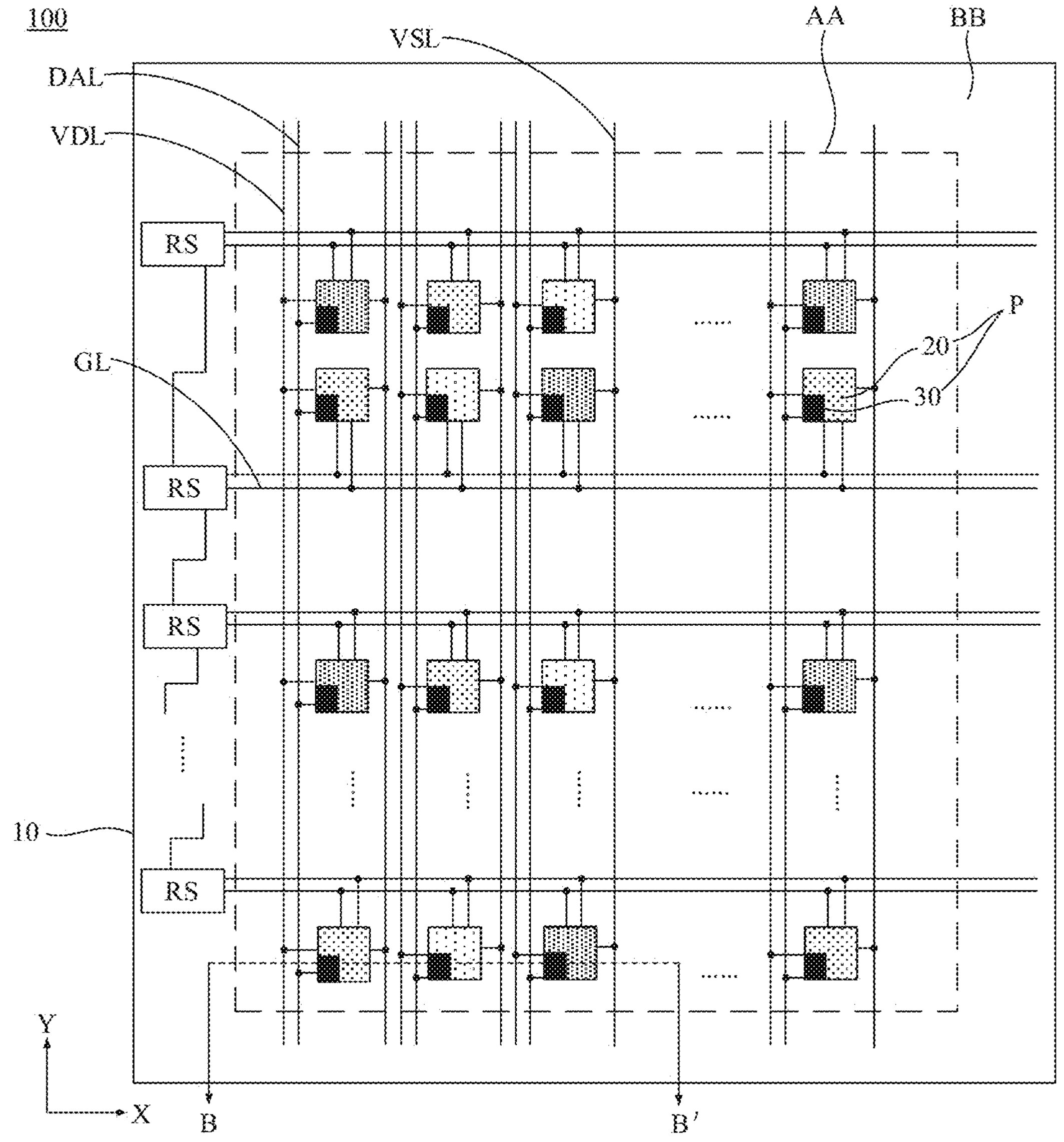
FIG. 4B is a structural diagram of another display panel, in accordance with some embodiments.

In some embodiments, as shown in FIGS. 4A and 4B, the display panel 100 has a display area A and a peripheral area B disposed on at least one side of the display area A. FIGS. 4A and 4B each show an example where the peripheral area BB is provided around the display area AA.

The display area AA is an area for displaying images and is configured to be provided with a plurality of sub-pixels P and a plurality of signal lines therein. The peripheral area BB is an area where no image is displayed, and the peripheral area BB is configured to be provided therein with display driver circuit(s), such as a gate driver circuit and a source driver circuit.

For example, referring to FIGS. 4A and 4B, the display panel 100 includes a substrate 10 and a plurality of sub-pixels P disposed on a side of the substrate 10 and located in the display area AA.

The type of the substrate 10 varies, and may be selected according to actual requirements.

For example, the substrate 10 is a rigid substrate. For example, the rigid substrate is a glass substrate or a polymethyl methacrylate (PMMA) substrate.

For example, the substrate 10 is a flexible substrate. For example, the flexible substrate is a polyethylene terephthalate (PET) substrate, a polyethylene naphthalate two formic acid glycol ester (PEN) substrate, or a polyimide (PI) substrate.

Referring to FIGS. 4A and 4B, the plurality of sub-pixels P may be arranged in an array of a plurality of rows and a plurality of columns. A row of sub-pixels P includes multiple sub-pixels P arranged in a first direction X, and a column of sub-pixels P includes multiple sub-pixels P arranged in a second direction Y The first direction X is substantially perpendicular to the second direction Y.

For convenience of description, multiple sub-pixels P arranged in a row in the first direction X are referred to as sub-pixels P in a same row, and multiple sub-pixels P arranged in a column in the second direction Y are referred to as sub-pixels P in a same column.

It will be noted that the first direction X is, for example, a row direction of which the plurality of sub-pixel P are arranged in an array, and the second direction Y is, for example, a column direction of which the plurality of sub-pixel P are arranged in an array. In the article, definitions of the row and the column are relative concepts, and indicate two different extension directions of the array arrangement.

Some embodiments of the present disclosure will be exemplarily described below by taking an example in which the plurality of sub-pixel P are arranged in an array of a plurality of rows and a plurality of columns, but the embodiments of the present disclosure are not limited thereto. Any other arrangement may also be considered, as long as the same technical ideas are applied.

Referring to FIGS. 4A and 4B, the plurality of sub-pixels P may include a first sub-pixel with a luminous color of a first color, a second sub-pixel with a luminous color of a second color and a third sub-pixel with a luminous color of a third color.

It will be noted that the first color, the second color and the third color are three primary colors. For example, the first color is red, the second color is blue, and the third color is green. In this case, grayscales of sub-pixels P of different colors are adjusted, and display of multiple colors may be achieved through color combination and superposition, thereby achieving full-color display of the display panel 100.

Figure 5:
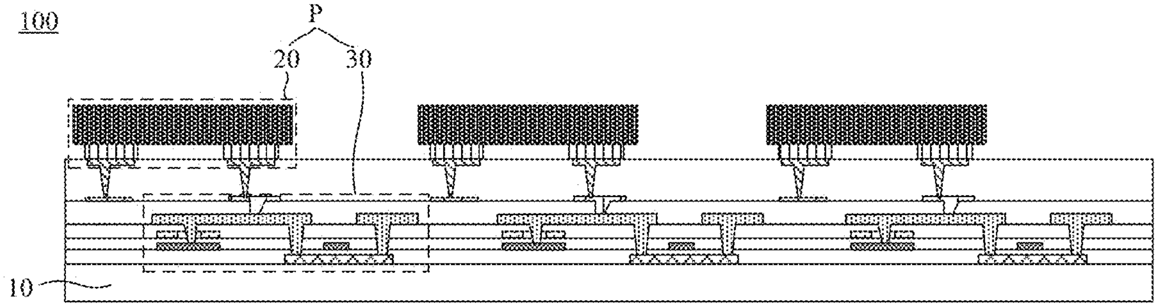
FIG. 5 is a cross-sectional view taken along a section line B-B' in FIG. 4A or 4B.

Referring to FIGS. 4A, 4B and 5, each sub-pixel P includes a light-emitting device 20 and a pixel circuit 30 that are disposed on the substrate 10.

As shown in FIG. 5, the light-emitting devices 20 may include a sub-millimeter light-emitting diode (mini light-emitting diode, mini LED) and/or a micro light-emitting diode (micro LED). In this case, the light-emitting device 20 has advantages of high brightness, long life and small size, and may meet the brightness and color gamut requirements using high-dynamic range (HDR) image technology.

A dimension (e.g., a length) of the micro LED is less than or equal to 100 μm. For example, the dimension (e.g., the length) of the micro LED is less than or equal to 50 μm. For example, the dimension (e.g., the length) of the micro LED is in a range of 10 μm to 50 μm, inclusive. For example, the dimension (e.g., the length) of the micro LED is any of 10 μm, 20 μm, 30 μm, 40 μm, 50 μm, 60 μm, 70 μm, 80 μm, 90 μm and 100 μm. The embodiments of the present disclosure are not specifically limited here.

A dimension (e.g., a length) of the mini LED is in a range of 50 μm to 500 μm, inclusive. For example, the dimension (e.g., the length) of the mini LED is in a range of 50 μm to 150 μm, inclusive. For example, the dimension (e.g., the length) of the mini LED is in a range of 80 μm to 120 μm, inclusive. For example, the dimension (e.g., the length) of the mini LED is any of 50 μm, 60 μm, 70 μm, 80 μm, 100 μm, 120 μm, 150 μm, 200 μm, 300 μm, 400 μm and 500 μm. The embodiments of the present disclosure are not specifically limited here.

Some embodiments of the present disclosure will be exemplarily described below by taking an example in which the light-emitting device 20 is a micro LED or a mini LED, but the embodiments of the present disclosure are not limited thereto.

As shown in FIG. 5, the pixel circuit 30 is coupled to the light-emitting device 20 to control the brightness (grayscale), light emission and light off of the light-emitting device 20.

In the related art, the micro LED or the mini LED adopts current drive control, that is, the pixel circuit controls a driving current input to the micro LED or the mini LED to control a luminous intensity (the grayscale) of the micro LED or the mini LED, so as to achieve display of different grayscales. For example, when a low grayscale display is performed, a small driving current is provided to reduce the luminous brightness (the grayscale) of the micro LED or the mini LED; and when a high grayscale is performed, a large driving current is provided to enhance the luminous brightness (the grayscale) of the micro LED or the mini LED.

However, the micro LED or the mini LED has characteristics of a high luminous efficiency at a high current density, a low luminous efficiency at a low current density, and a main wave peak shifting with a change of a current density. The specific performance is as follows: when the driving current input to the micro LED or the mini LED reaches a certain value, the luminous efficiency of the micro LED or the mini LED reaches the highest level; and when the driving current does not reach the value, the luminous efficiency of the micro LED or the mini LED is maintaining at a climbing stage. That is, as the driving current provided increases, the luminous intensity of the micro LED or the mini LED gradually increases, and the luminous efficiency gradually increases.

Therefore, in the related art, in a case where the micro LED or the mini LED adopts current drive control, when a low grayscale display is performed, a driving current input to the micro LED or the mini LED is low, the micro LED or the mini LED is under a low current density, and the micro LED or the mini LED has a low luminous efficiency, resulting in high energy consumption and poor brightness uniformity of the display panel.

Figure 6:
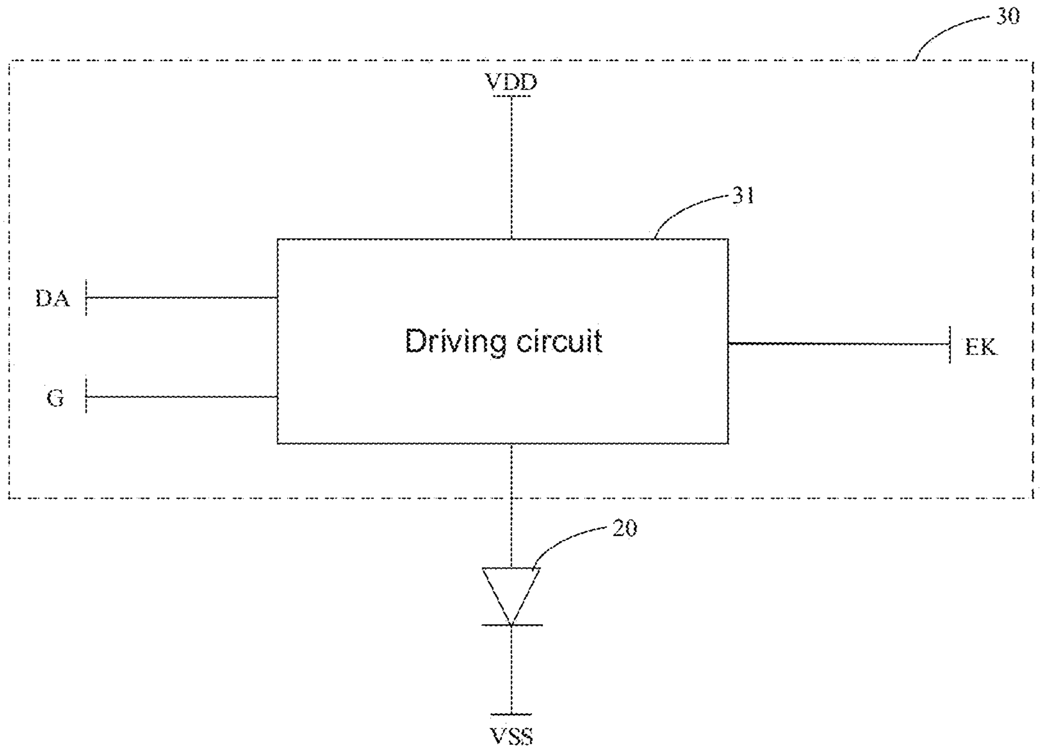
FIG. 6 is a block diagram of a driving circuit, in accordance with some embodiments.
Figure 30:
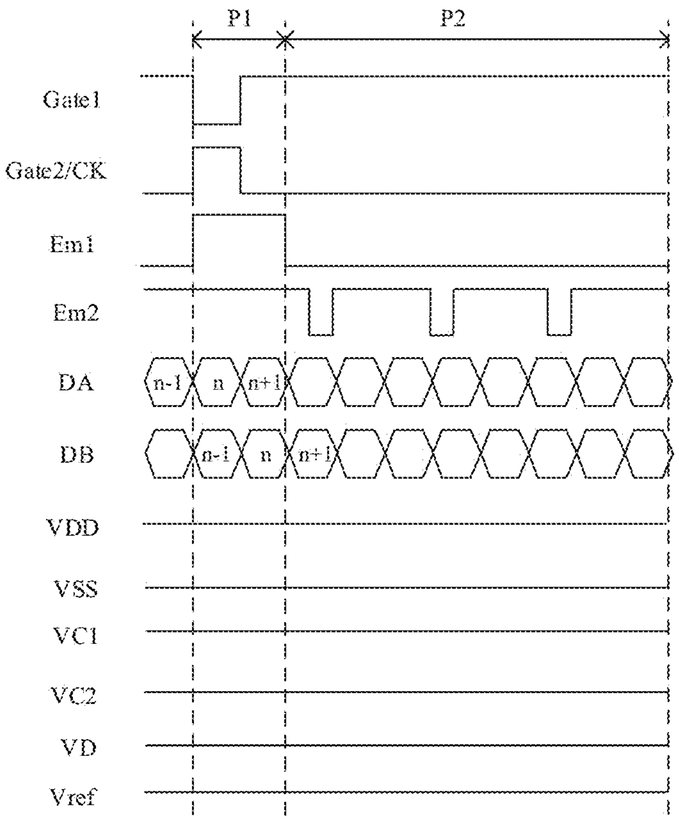
FIG. 30 is a timing diagram of the pixel circuit shown in FIG. 24.

In light of this, as shown in FIG. 6, some embodiments of the present disclosure provide a pixel circuit 30. The pixel circuit 30 includes a driving circuit 31. As shown in FIG. 30, a frame period at least includes a data writing phase P1 and a light emission phase P2.

As shown in FIG. 6, the driving circuit 31 is coupled to a grayscale data signal terminal DA, a scan signal terminal G, a first power supply voltage terminal VDD, an enable signal control terminal EK and a light-emitting device 20.

The driving circuit 31 is configured to control on and off of a current path for transmitting a driving current signal under control of a scan signal received at the scan signal terminal G and a signal received at the enable signal control terminal EK. The specific performance is as follows.

The driving circuit 31 writes, in response to the scan signal received at the scan signal terminal G, a grayscale data signal received at the grayscale data signal terminal DA, and in response to an enable control signal received at the enable signal control terminal EK, generates a driving current signal based on the written grayscale data signal and a first voltage signal received at the first power supply voltage terminal VDD and controls the on and off of the current path for transmitting the driving current signal.

In this case, referring to FIGS. 6 and 30, in the data writing phase P1, the driving circuit 31 writes the grayscale data signal received at the grayscale data signal terminal DA in response to the scan signal received at the scan signal terminal G. In the light emission phase P2, the driving circuit 31 transmits the driving current signal to the light-emitting device 20 in response to the enable control signal received at the enable signal control terminal EK, so as to control light emission of the light-emitting device 20 and adjustment of the grayscale.

The first power supply voltage terminal VDD may be configured to receive a signal from a positive electrode of a direct current power supply, and the signal from the positive electrode of the direct current power supply is referred to as the first voltage signal. For example, the first voltage signal is 5 V.

For example, referring to FIGS. 4A and 6, the display panel 100 may further include a plurality of signal lines disposed on a side of the substrate 10. The plurality of signal lines may include first power supply voltage signal lines VDL. A first power supply voltage terminal VDD may be coupled to a first power supply voltage signal line VDL, and the first power supply voltage terminal VDD receives the first voltage signal transmitted from the first power supply voltage signal line VDL.

Figure 8:
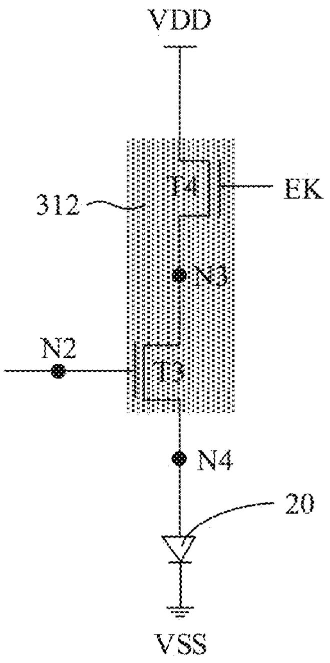
FIG. 8 is a circuit diagram of a driving signal generation sub-circuit, in accordance with some embodiments.

For example, as shown in FIGS. 4A and 8, the first power supply voltage signal line VDL may extend in the second direction Y First power supply voltage terminals VDD of the pixel circuits 30 in the same column may be coupled to the same first power supply voltage signal line VDL.

Figure 7:
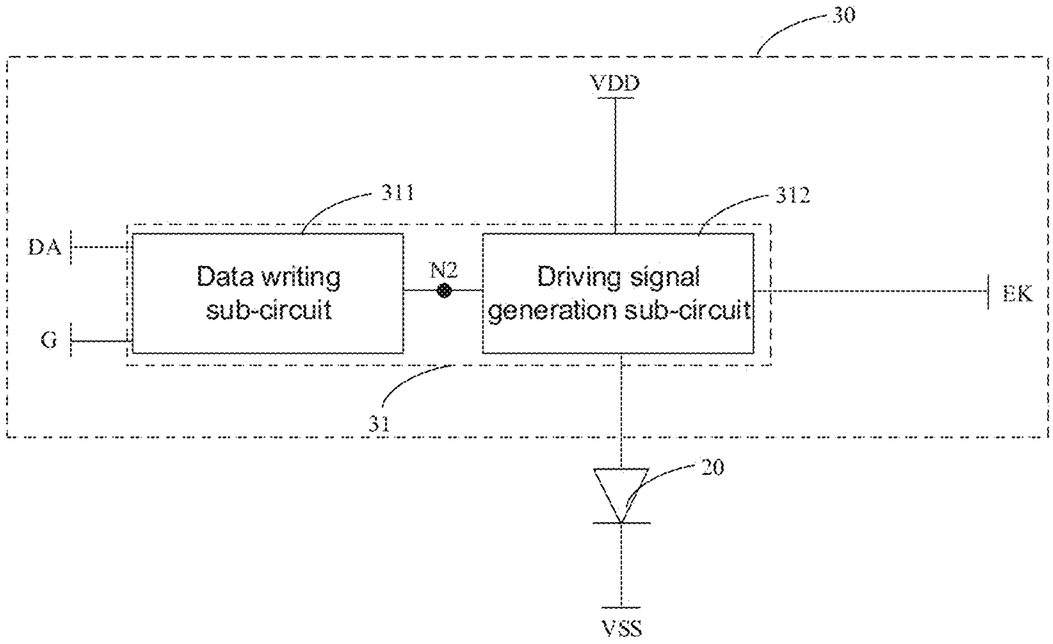
FIG. 7 is a block diagram of another driving circuit, in accordance with some embodiments.

In some embodiments, as shown in FIG. 7, the driving circuit 31 includes a data writing sub-circuit 311 and a driving signal generation sub-circuit 312.

For example, referring to FIG. 7, the driving signal generation sub-circuit 312 is coupled to a second node N2, the first power supply voltage terminal VDD, the enable signal control terminal EK and the light-emitting device 20. The driving signal generation sub-circuit 312 is configured to generate the driving current signal based on a voltage at the second node N2 and the first voltage signal received at the first power supply voltage terminal VDD, and control the on and off of the current path for transmitting the driving current signal in response to the signal received at the enable signal control terminal EK.

For example, referring to FIG. 8, the driving signal generation sub-circuit 312 includes a third transistor T3 and a fourth transistor T4.

As shown in FIG. 8, a first electrode of the third transistor T3 is coupled to a third node N3, a second electrode of the third transistor T3 is coupled to a fourth node N4, and a control electrode of the third transistor T3 is coupled to the second node N2.

As shown in FIG. 8, the fourth node N4 is also coupled to a first electrode of the light-emitting device 20, and a second electrode of the light-emitting device 20 is coupled to a second power supply voltage terminal VSS.

It will be noted that the first electrode of the light-emitting device 20 is an anode of the light-emitting device 20, and the second electrode of the light-emitting device 20 is a cathode of the light-emitting device.

The second power supply voltage terminal VSS may be configured to receive a signal from a negative electrode of the direct current power supply. Here, the signal from the negative electrode of the direct current power supply is referred to as a second voltage signal, and a voltage value of the second voltage signal is less than a voltage value of the first voltage signal. For example, the second voltage signal is −3 V.

On this basis, referring to FIGS. 4A and 7, the display panel 100 may further include a plurality of signal lines disposed on a side of the substrate 10. The plurality of signal lines may include second power supply voltage signal lines VSL. A second power supply voltage terminal VSS may be coupled to a second power supply voltage signal line VSL, and the second power supply voltage terminal VSS receives the second voltage signal transmitted from the second power supply voltage signal line VSL.

For example, as shown in FIGS. 4A and 8, the second power supply voltage signal line VSL may extend in the second direction Y Second power supply voltage terminals VSS of the pixel circuits 30 in the same column may be coupled to the same second power supply voltage signal line VSL.

As shown in FIG. 8, a first electrode of the fourth transistor T4 is coupled to the first power supply voltage terminal VDD, a second electrode of the fourth transistor T4 is coupled to the third node N3, and a control electrode of the fourth transistor T4 is coupled to the enable signal control terminal EK.

With such a provision, as shown in FIG. 8, the second electrode of the third transistor T3 may be directly connected to the light-emitting device 20, that is, there are no other transistors on a path between the third transistor T3 and the light-emitting device 20. In this case, the fourth transistor T4 has a small influence on a voltage difference between the control electrode of the third transistor T3 and the second electrode of the third transistor T3, and the current of the generated driving current signal may increase, thereby improving the maximum brightness of the light-emitting device 20.

It will be understood that the third transistor T3 may be an N-type transistor or a P-type transistor, and the fourth transistor T4 may be an N-type transistor or a P-type transistor. Some embodiments of the present disclosure will be exemplarily described below by taking an example where the third transistor T3 and the fourth transistor T4 are both N-type transistors, but the embodiments of the present disclosure are not limited thereto.

In a case where a voltage at the enable signal control terminal EK is at a high level, the fourth transistor T4 is turned on. The third transistor T3 generates a driving current signal under control of a voltage at the second node N2 and the first voltage signal received at the first power supply voltage terminal VDD, and the driving current signal is transmitted to the light-emitting device 20 through the turned-on fourth transistor T4. The light-emitting device 20 emits light due to action of the driving current signal.

Figure 9:
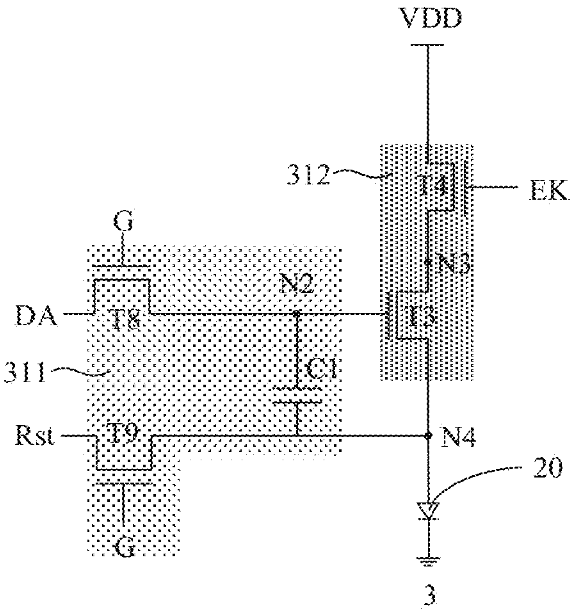
FIG. 9 is a circuit diagram of a driving circuit, in accordance with some embodiments.
Figure 10:
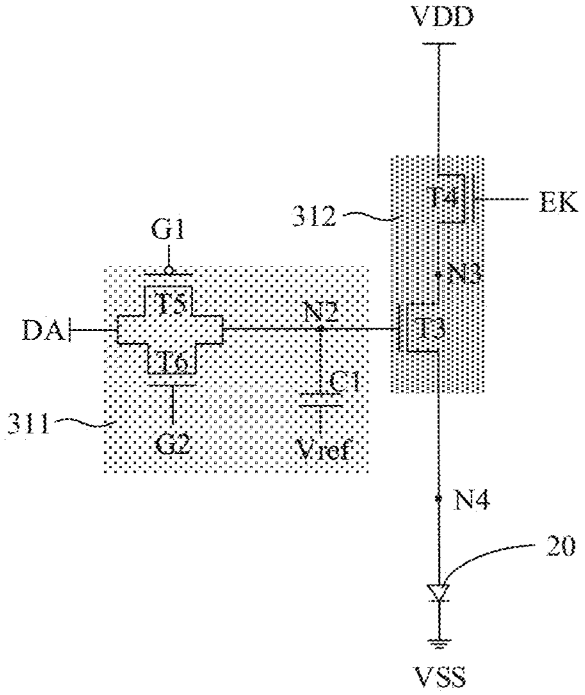
FIG. 10 is a circuit diagram of another driving circuit, in accordance with some embodiments.

For example, referring to FIGS. 7, 9 and 10, the data writing sub-circuit 311 is coupled to the grayscale data signal terminal DA, the scan signal terminal G and the second node N2. The data writing sub-circuit 311 is configured to transmit the grayscale data signal received at the grayscale data signal terminal DA to the second node N2 in response to the scan signal received at the scan signal terminal G.

In some examples, referring to FIG. 9, the data writing sub-circuit 311 is further coupled to a reset signal terminal Rst.

On this basis, the data writing sub-circuit 311 includes an eighth transistor T8, a ninth transistor T9 and a first capacitor C1.

As shown in FIG. 9, a first electrode of the eighth transistor T8 is coupled to the grayscale data signal terminal DA, a second electrode of the eighth transistor T8 is coupled to the second node N2, and a control electrode of the eighth transistor T8 is coupled to the scan signal terminal G.

As shown in FIG. 9, a first electrode of the ninth transistor T9 is coupled to the reset signal terminal Rst, a second electrode of the ninth transistor T9 is coupled to the fourth node N4, and a control electrode of the ninth transistor T9 is coupled to the scan signal terminal G.

The ninth transistor T9 and the eighth transistor T8 have the same conduction type. That is, the ninth transistor T9 and the eighth transistor T8 are both P-type transistors or both N-type transistors. Some embodiments of the present disclosure will be exemplarily described below by taking an example where the eighth transistor T8 and the ninth transistor T9 are both N-type transistors, but the embodiments of the present disclosure are not limited thereto.

In this case, control electrodes of the eighth transistor T8 and the ninth transistor T9 may be connected to the same scan signal terminal G, that is, the control electrodes of the eighth transistor T8 and the ninth transistor T9 may be connected to the same signal line, which is beneficial to simplifying the circuit.

On this basis, referring to FIGS. 4A and 9, the display panel 100 may further include a plurality of signal lines disposed on a side of the substrate 10. The plurality of signal lines may include scan signal lines GL. A scan signal terminal G may be coupled to a scan signal line GL, and the scan signal terminal G receives the scan signal transmitted from the scan signal line GL.

For example, as shown in FIGS. 4A and 9, the scan signal line may extend in the first direction X. Scan signal terminals G of the pixel circuits 30 in the same row may be coupled to the same scan signal line to reduce the number of the signal lines and simplify the circuit.

In addition, as shown in FIG. 4A, the display panel 100 may further include a gate driver circuit disposed on a side of the substrate 10 and located in the peripheral area BB. The gate driver circuit includes a plurality of shift register circuits RS that are cascaded. Each shift register circuit RS is electrically connected to a row of pixel circuits 30.

For example, as shown in FIGS. 4A and 9, each shift register circuit RS is coupled to a scan signal line GL, that is, each shift register circuit RS is coupled to scan signal terminals G of pixel circuits 30 in a row and is configured to transmit a scan signal to the coupled pixel circuits 30.

As shown in FIG. 9, a first electrode plate of the first capacitor C1 is coupled to the second node N2, and a second electrode plate of the first capacitor C1 is coupled to the fourth node N4.

Based on the above, in a case where the eighth transistor T8 and the ninth transistor T9 are both N-type transistors, when the scan signal received at the scan signal terminal G is at a high level, the eighth transistor T8 is turned on, and the grayscale data signal received at the grayscale data signal terminal DA is transmitted to the second node N2 through the eighth transistor T8. Simultaneously, the ninth transistor T9 is turned on, and a reset signal received at the reset signal terminal Rst is transmitted to the fourth node N4 through the ninth transistor T9, so that a voltage at the fourth node N4 is reset.

In this case, since the fourth node N4 is also coupled to the first electrode of the light-emitting device 20, before the light-emitting device 20 receives the driving current signal, the voltage at the fourth node N4 is reset, so as to prevent the driving current signal from being affected by a previous voltage at the fourth node N4, thereby improving the accuracy of the driving current signal and enhancing the accuracy of the luminous brightness of the light-emitting device 20.

In some other examples, referring to FIG. 10, the data writing sub-circuit 311 is further coupled to a reference voltage terminal Vref, and the above scan signal terminal G includes a first scan signal terminal G1 and a second scan signal terminal G2.

On this basis, as shown in FIG. 10, the data writing sub-circuit 311 may, for example, include a fifth transistor T5, a sixth transistor T6 and a first capacitor C1.

As shown in FIG. 10, a first electrode of the fifth transistor T5 is coupled to the grayscale data signal terminal DA, a second electrode of the fifth transistor T5 is coupled to the second node N2, and a control electrode of the fifth transistor T5 is coupled to the first scan signal terminal G1.

As shown in FIG. 10, a first electrode of the sixth transistor T6 is coupled to the grayscale data signal terminal DA, a second electrode of the sixth transistor T6 is coupled to the second node N2, and a control electrode of the sixth transistor T6 is coupled to the second scan signal terminal G2.

The sixth transistor T6 and the fifth transistor T5 have inverse conduction types. That is, of the fifth transistor T5 and the sixth transistor T6, one is a P-type transistor, and the other is an N-type transistor. Some embodiments of the present disclosure will be exemplarily described below by taking an example where the fifth transistor T5 is a P-type transistor, and the sixth transistor T6 is an N-type transistor, but the embodiments of the present disclosure are not limited thereto.

In this case, the fifth transistor T5 and the sixth transistor T6 are connected in parallel to constitute a complementary metal oxide semiconductor (CMOS) transmission gate. The CMOS transmission gate has an on-resistance (several hundred ohms) and a very high off-resistance (greater than $10^9$ ohms). In this case, the CMOS transmission gate composed of the fifth transistor T5 and the sixth transistor T6 is beneficial to transmission of the grayscale data signal. For example, when the CMOS transmission gate is turned on, the grayscale data signal received at the grayscale data signal terminal DA may be transmitted to the second node N2, the loss is small; and when the CMOS transmission gate is turned off, a current path between the grayscale data signal terminal DA and the second node N2 has an extremely large off resistance to avoid a leakage current.

It will be noted that when the CMOS transmission gate is turned on, a voltage of a first scan signal received at the first scan signal terminal G1 is at a low level, and a voltage of a second scan signal received at the second scan signal terminal G2 is at a high level. When the CMOS transmission gate is turned off, a voltage of the first scan signal received at the first scan signal terminal G1 is at a high level, and a voltage of the second scan signal received at the second scan signal terminal G2 is at a low level.

On this basis, referring to FIG. 4B, the display panel 100 may further include a plurality of signal lines disposed on a side of the substrate 10. The plurality of signal lines may include scan signal lines GL.

As shown in FIGS. 4B and 10, the first scan signal terminal G1 and the second scan signal terminal G2 may each be coupled to a respective scan signal line GL.

For example, as shown in FIGS. 4B and 10, the scan signal line GL may extend in the first direction X. First scan signal terminals G1 and second scan signal terminals G2 of the pixel circuits 30 in the same row may each be coupled to a respective scan signal line GL.

In addition, as shown in FIG. 4B, the display panel 100 may further include a gate driver circuit disposed on a side of the substrate 10 and located in the peripheral area BB. The gate driver circuit includes a plurality of shift register circuits RS that are cascaded. Each shift register circuit RS is electrically connected to a row of pixel circuits 30.

For example, as shown in FIGS. 4B and 10, each shift register circuit RS is coupled to two scan signal lines GL, that is, each shift register circuit RS is coupled to the first scan signal terminals G1 and the second scan signal terminals G2 of the pixel circuits 30 in the same row and configured to transmit the first scan signal and the second scan signal to the coupled pixel circuits 30.

As shown in FIG. 10, a first electrode plate of the first capacitor C1 is coupled to the second node N2, and a second electrode plate of the first capacitor C1 is coupled to the reference voltage terminal Vref. A voltage at the reference voltage terminal Vref may be at a low level. For example, the voltage at the reference voltage terminal Vref is zero or 1 V.

Based on the above, in a case where the fifth transistor T5 is a P-type transistor and the sixth transistor T6 is an N-type transistor, when the voltage of the first scan signal received at the first scan signal terminal G1 is at a low level, and the voltage of the second scan signal received at the second scan signal terminal G2 is at a high level, the fifth transistor T5 and the sixth transistor T6 are turned on, and the grayscale data signal received at the grayscale data signal terminal DA may be transmitted to the second node N2.

Figure 11:
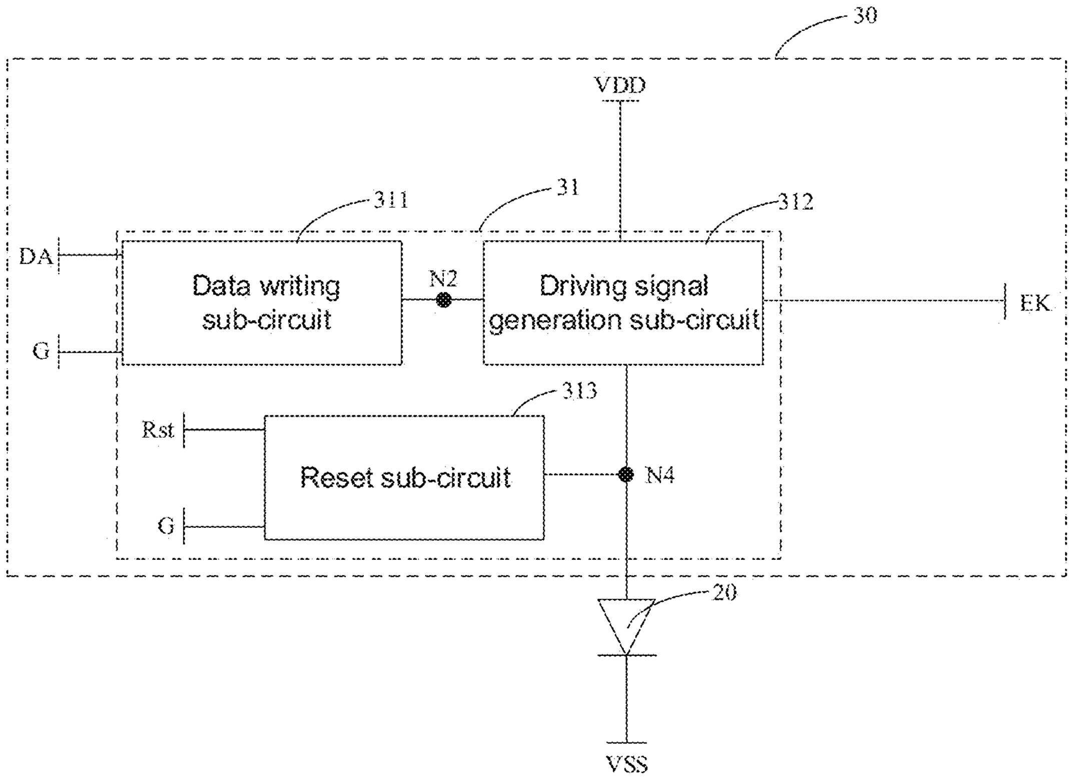
FIG. 11 is a block diagram of another driving circuit, in accordance with some embodiments.

Based on this, referring to FIG. 11, the driving circuit 31 may further include a reset sub-circuit 313.

For example, as shown in FIG. 11, the reset sub-circuit 313 is coupled to the scan signal terminal G, the fourth node N4 and the reset signal terminal Rst. The reset sub-circuit 313 is configured to, in response to the scan signal received at the scan signal terminal G, transmit the reset signal received at the reset signal terminal Rst to the fourth node N4 to reset the fourth node N4.

In this case, since the fourth node N4 is also coupled to the first electrode of the light-emitting device 20, before the light-emitting device 20 receives the driving current signal, the voltage at the fourth node N4 is reset, so as to prevent the driving current signal from being affected by a previous voltage at the fourth node N4, thereby improving the accuracy of the driving current signal and enhancing the accuracy of the luminous brightness of the light-emitting device 20.

Figure 12:
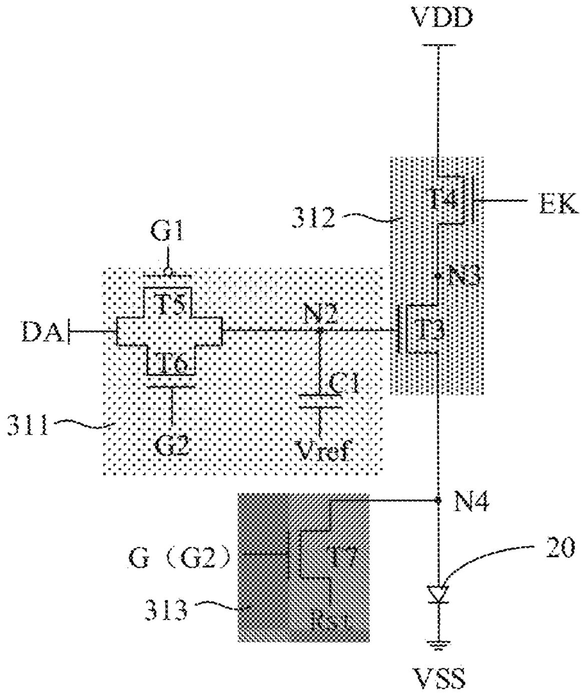
FIG. 12 is a circuit diagram of another driving circuit, in accordance with some embodiments.

For example, referring to FIG. 12, the reset sub-circuit 313 includes a seventh transistor T7.

As shown in FIG. 12, a first electrode of the seventh transistor T7 is coupled to the reset signal terminal Rst, a second electrode of the seventh transistor T7 is coupled to the fourth node N4, and a control electrode of the seventh transistor T7 is coupled to the scan signal terminal G.

The seventh transistor T7 may have the same conduction type as the fifth transistor T5, or may have the same conduction type as the sixth transistor T6.

In a case where the seventh transistor T7 and the fifth transistor T5 have the same conduction type, a scan signal terminal G coupled to the seventh transistor T7 may be connected to the same first scan signal line as the first scan signal terminal G1, that is, the scan signal terminal G coupled to the seventh transistor T7 may be the first scan signal terminal G1.

In a case where the seventh transistor T7 and the sixth transistor T6 have the same conduction type, a scan signal terminal G coupled to the seventh transistor T7 may be connected to the same second scan signal line as the second scan signal terminal G2, that is, the scan signal terminal G coupled to the seventh transistor T7 may be the second scan signal terminal G2.

Some embodiments of the present disclosure will be exemplarily described below by taking an example where the seventh transistor T7 and the sixth transistor T6 have the same conduction type and are both N-type transistors, but the embodiments of the present disclosure are not limited thereto.

In this case, the scan signal terminal G coupled to the seventh transistor T7 is the second scan signal terminal G2. The voltage of the second scan signal received at the second scan signal terminal G2 is at a high level, the seventh transistor T7 is turned on, and the reset signal received at the reset signal terminal Rst may be transmitted to the fourth node N4, so that the voltage at the fourth node N4 is reset.

It will be understood that the current of the driving current signal is controlled by the grayscale data signal, and driving current signals with different currents control the luminous brightness of the light-emitting device 20 to be different. The greater the current of the driving current signal, the greater the luminous brightness of the light-emitting device 20, that is, the higher the grayscale of the light-emitting device 20.

That is to say, the driving signal generation sub-circuit 312 generates the driving current signal based on a voltage (the grayscale data signal) written to the second node N2 and the first voltage signal received at the first power supply voltage terminal VDD, and controls a current path between the driving signal generation sub-circuit 312 and the light-emitting device 20 to be on to transmit the driving current signal to the light-emitting device 20 in response to the signal received at the enable signal control terminal EK. Depending on the magnitude of the current of the driving current signal, the action of the light-emitting device 20 is controlled, for example, the brightness (the grayscale) increases.

In addition, when an instantaneous brightness (a grayscale) of the light-emitting device 20 does not change, within a frame, a ratio of a light emission time to a light off time of the light-emitting device 20 is controlled, that is, controlling light emission and light off of the light-emitting device 20 may adjust an overall brightness of the display panel 100.

That is to say, the driving signal generation sub-circuit 312 generates the driving current signal based on a voltage (the grayscale data signal) written to the second node N2 and the first voltage signal received at the first power supply voltage terminal VDD, and controls a current path between the driving signal generation sub-circuit 312 and the light-emitting device 20 to be on intermittently to transmit the driving current signal to the light-emitting device 20 intermittently in response to the signal received at the enable signal control terminal EK. Depending on a duration of the driving current signal transmitted to the light-emitting device 20 within a frame, the action of the light-emitting device 20 is controlled, for example, the brightness (the grayscale) increases.

It can be seen from the above that in a case where a target grayscale of the light-emitting device 20 is greater than a first grayscale, in the light emission phase P2 (referring to FIG. 30), the current path between the driving signal generation sub-circuit 312 and the light-emitting device 20 may be on continuously. By controlling the grayscale data signal received at the grayscale data signal terminal DA, the current of the driving current signal is changed, thereby controlling the grayscale of the light-emitting device 20.

In addition, in a case where the target grayscale of the light-emitting device 20 is less than or equal to the first grayscale, in the light emission phase P2 (referring to FIG. 30), the current path between the driving signal generation sub-circuit 312 and the light-emitting device 20 may be allowed to be on intermittently, the current of the driving current signal is changed by controlling the grayscale data signal received at the grayscale data signal terminal DA, and a duration of the driving current signal transmitted to the light-emitting device 20 is changed by controlling on and off of the current path between the driving signal generation sub-circuit 312 and the light-emitting device 20, thereby controlling the grayscale of the light-emitting device 20.

It will be noted that the first grayscale may be a certain grayscale specified by the light-emitting device 20, which is selected depending on the specific characteristics of the light-emitting device 20. In a case where the grayscale of the light-emitting device 20 is less than the first grayscale, a main wave peak of the light-emitting device 20 will shift with a change of a current density; and in a case where the grayscale of the light-emitting device 20 is greater than the first grayscale, the main wave peak of the light-emitting device 20 is fixed.

In summary, through combination of the above two methods, the light-emitting device 20 may achieve full-grayscale display under a high current density, thereby improving the luminous efficiency of the light-emitting device 20, reducing the high energy consumption of the display panel 100, and improving the brightness uniformity of the display panel 100.

Figure 13:
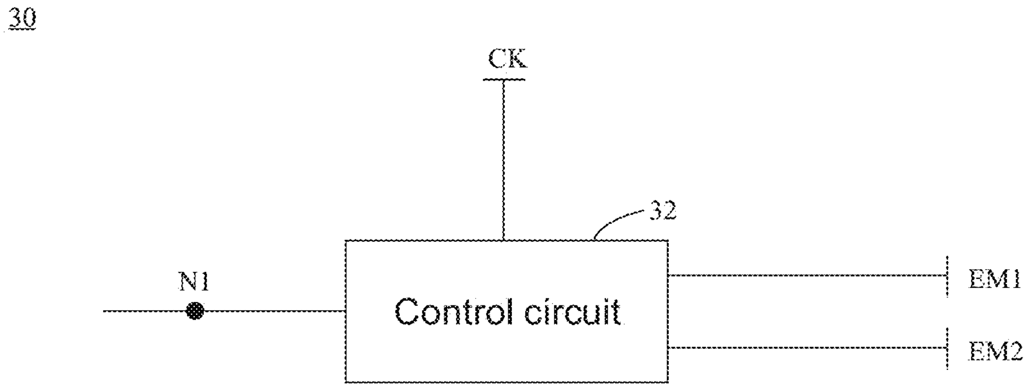
FIG. 13 is a block diagram of a control circuit, in accordance with some embodiments.
Figure 14:
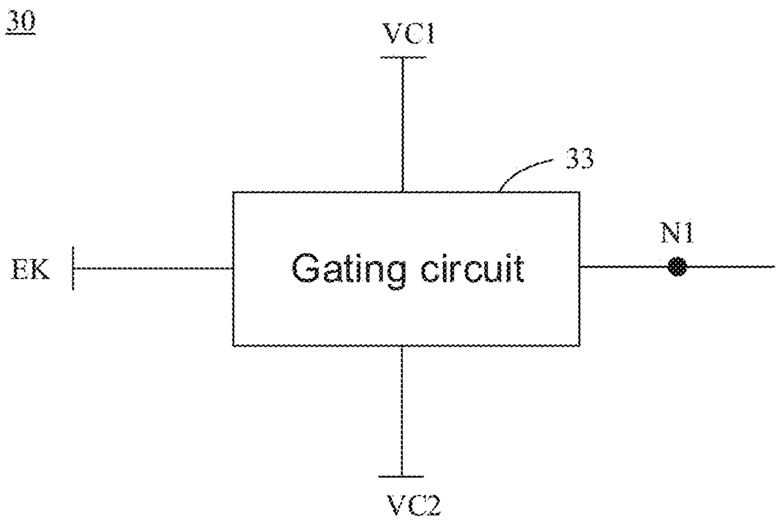
FIG. 14 is a block diagram of a gating circuit, in accordance with some embodiments.

Based on this, referring to FIGS. 13 and 14, the above pixel circuit 30 further includes a control circuit 32 and a gating circuit 33.

In some embodiments, as shown in FIG. 13, the control circuit 32 is coupled to a control signal terminal CK, a first node N1, a first enable signal terminal EM1 and a second enable signal terminal EM2.

The control circuit 32 is configured to transmit a first enable signal received at the first enable signal terminal EM1 or a second enable signal received at the second enable signal terminal EM2 to the first node N1 under control of a control signal received at the control signal terminal CK.

Figure 22:
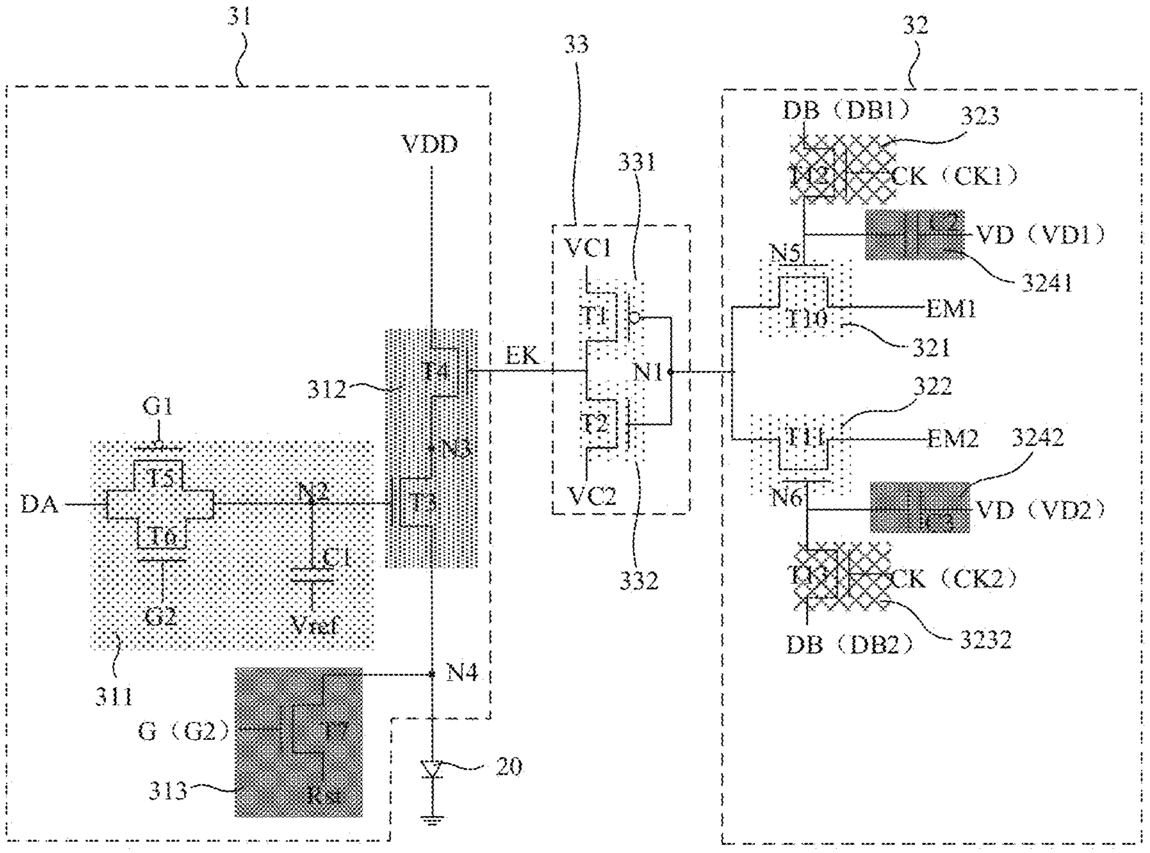
FIG. 22 is a circuit diagram of a pixel circuit, in accordance with some embodiments.

For example, as shown in FIGS. 13, 22 and 30, in the light emission phase P2, in a case where the target grayscale of the light-emitting device 20 is greater than the first grayscale, the control circuit 32 may transmit the first enable signal received at the first enable signal terminal EM1 to the first node N1.

For example, as shown in FIGS. 13, 22 and 30, in the light emission phase P2, in a case where the target grayscale of the light-emitting device 20 is less than or equal to the first grayscale, the control circuit 32 may transmit the second enable signal received at the second enable signal terminal EM2 to the first node N1.

It will be noted that in the light emission phase P2, the first enable signal received at the first enable signal terminal EM1 is a direct current signal with a constant voltage, and the second enable signal received at the second enable signal terminal EM2 is a pulse signal.

A duty cycle of the second enable signal may be in a range of 0.2% to 100%, inclusive. It will be understood that if the duty cycle of the second enable signal is less than 0.2%, the light-emitting device 20 cannot emit light normally.

In addition, if a frequency of the pulse voltage signal is too low, it is easy to detect flicker by human eyes, which affects the perception; and if the frequency of the pulse voltage signal is too high, it is difficult to implement.

For example, the frequency of the pulse voltage signal is in a range of 3000 Hz to 60000 Hz, inclusive, and the flicker of the light-emitting device 20 will not be detected by the human eyes and it is easy to implement. For example, the frequency of the pulse voltage signal is 3000 Hz, 5000 Hz, 8000 Hz, 10000 Hz, 30000 Hz, 50000 Hz, or 60000 Hz.

In some embodiments, as shown in FIG. 14, the gating circuit 33 is coupled to the enable signal control terminal EK, the first node N1, a first constant voltage signal terminal VC1 and a second constant voltage signal terminal VC2.

The gating circuit 33 is configured to, in response to the enable signal received at the first node N1, transmit a first constant voltage signal received at the first constant voltage signal terminal VC1 or a second constant voltage signal received at the second constant voltage signal terminal VC2 to the enable signal control terminal EK.

Of the first constant voltage signal and the second constant voltage signal, one is a direct current high-level signal, and the other is a direct current low-level signal.

Figure 15:
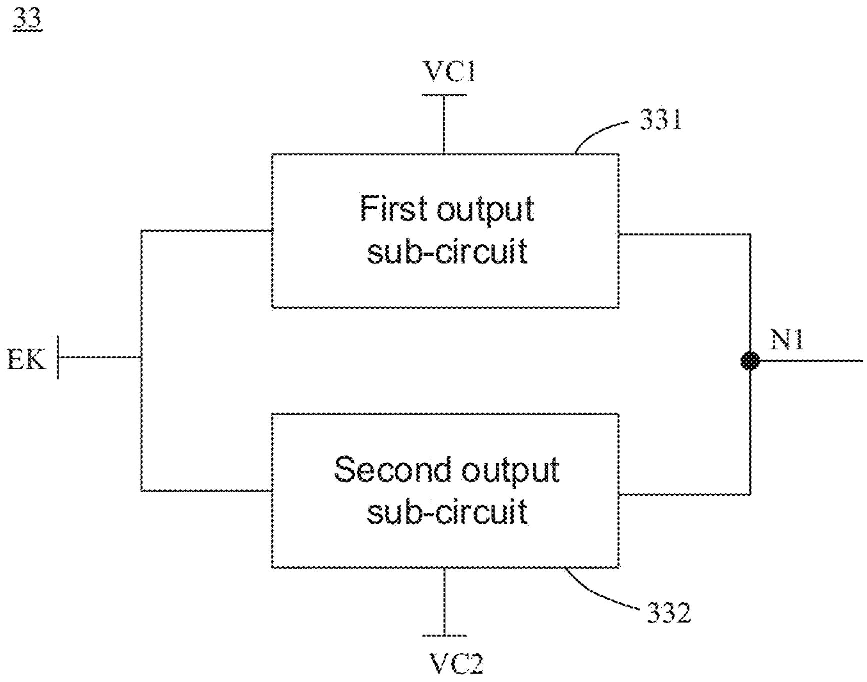
FIG. 15 is a block diagram of another gating circuit, in accordance with some embodiments.

For example, referring to FIG. 15, the gating circuit 33 includes a first output sub-circuit 331 and a second output sub-circuit 332.

As shown in FIG. 15, the first output sub-circuit 331 is coupled to the enable signal control terminal EK, the first node N1 and the first constant voltage signal terminal VC1. The first output sub-circuit 331 is configured to, in response to the enable signal received at the first node N1, transmit a first constant voltage signal received at the first constant voltage signal terminal VC1 to the enable signal control terminal EK.

Figure 16:
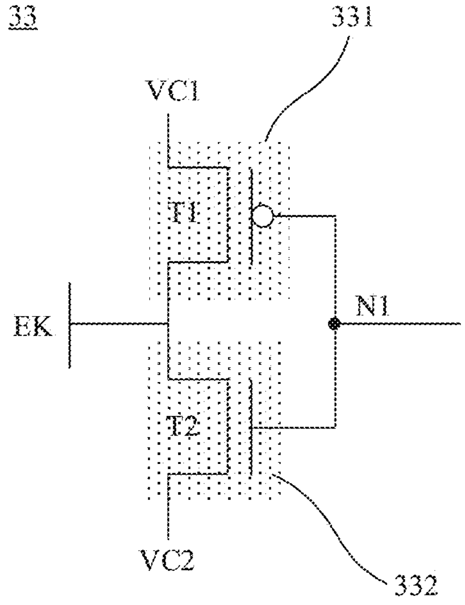
FIG. 16 is a circuit diagram of a gating circuit, in accordance with some embodiments.

For example, referring to FIG. 16, the first output sub-circuit 331 includes a first transistor T1. A first electrode of the first transistor T1 is coupled to the first constant voltage signal terminal VC1, a second electrode of the first transistor T1 is coupled to the enable signal control terminal EK, and a control electrode of the first transistor T1 is coupled to the first node N1.

As shown in FIG. 15, the second output sub-circuit 332 is coupled to the enable signal control terminal EK, the first node N1 and the second constant voltage signal terminal VC2. The second output sub-circuit 332 is configured to, in response to the enable signal received at the first node N1, transmit a second constant voltage signal received at the second constant voltage signal terminal VC2 to the enable signal control terminal EK.

For example, referring to FIG. 16, the second output sub-circuit 332 includes a second transistor T2. A first electrode of the second transistor T2 is coupled to the second constant voltage signal terminal VC2, a second electrode of the second transistor T2 is coupled to the enable signal control terminal EK, and a control electrode of the second transistor T2 is coupled to the first node N1.

The second transistor T2 and the first transistor T1 have inverse conduction types. For example, of the first transistor T1 and the second transistor T2, one is a P-type transistor, and the other is an N-type transistor.

Some embodiments of the present disclosure will be exemplarily described below by taking an example where the first transistor T1 is a P-type transistor and the second transistor T2 is an N-type transistor, but the embodiments of the present disclosure are not limited thereto.

In this case, as shown in FIG. 16, in a case where a voltage of a signal received at the first node N1 is at a high level, the first transistor T1 is turned off, and the second transistor T2 is turned on, so that the second constant voltage signal received at the second constant voltage signal terminal VC2 is transmitted to the enable signal control terminal EK.

As shown in FIG. 16, in a case where the voltage of the signal received at the first node N1 is at a low level, the first transistor T1 is turned on, and the second transistor T2 is turned off, so that the first constant voltage signal received at the first constant voltage signal terminal VC1 is transmitted to the enable signal control terminal EK.

The first constant voltage signal received at the first constant voltage signal terminal VC1 is greater than the second constant voltage signal received at the second constant voltage signal terminal VC2. That is, the first constant voltage signal received at the first constant voltage signal terminal VC1 is a direct current high-level signal, for example, the first constant voltage signal is 5 V; and the second constant voltage signal received at the second constant voltage signal terminal VC2 is a low level signal, for example, the second constant voltage signal is 0 V.

In this way, a voltage of a signal from the first node N1 received by the gating circuit 33 is opposite to a voltage of a signal transmitted by the gating circuit 33 to the enable signal control terminal EK. With such a provision, when the gating circuit 33 is turned on, input impedance formed is small, a voltage drop is small, and the energy consumption is low; and when the gating circuit 33 is turned off, the impedance is very high to avoid the leakage current.

On this basis, the first constant voltage signal terminal VC1 is, for example, coupled to the first power supply voltage terminal VDD, that is, the first constant voltage signal terminal VC1 may be coupled to the first power supply voltage signal line to simplify the circuit. The second constant voltage signal terminal VC2 is, for example, grounded.

The embodiments of the present disclosure will be exemplarily described below by taking an example where the first constant voltage signal is a direct current high-level signal and the second constant voltage signal is a direct current low-level signal, but the embodiments of the present disclosure are not limited thereto.

In the light emission phase P2 (referring to FIG. 30), in a case where the target grayscale of the light-emitting device 20 is greater than the first grayscale, the gating circuit 33, in response to the first enable signal received at the first node N1, continuously transmits the second constant voltage signal received at the second constant voltage signal terminal VC2 to the enable signal control terminal EK, so that the fourth transistor T4 keeps to be turned on, and thus the current path between the driving signal generation sub-circuit 312 and the light-emitting device 20 keeps to be on.

In this case, the current of the driving current signal may be changed by controlling the grayscale data signal received at the grayscale data signal terminal DA, so as to control the grayscale of the light-emitting device 20, thereby achieving high grayscale (the target grayscale is greater than the first grayscale) display of the display panel 100.

In the light emission phase P2 (referring to FIG. 30), in a case where the target grayscale of the light-emitting device 20 is less than or equal to the first grayscale, the gating circuit 33, in response to the second enable signal received at the first node N1, alternately transmits the first constant voltage signal received at the first constant voltage signal terminal VC1 and the second constant voltage signal received at the second constant voltage signal terminal VC2 to the enable signal control terminal EK, so that the fourth transistor T4 is turned on intermittently, and thus the current path between the driving signal generation sub-circuit 312 and the light-emitting device 20 is on intermittently.

In this case, the current of the driving current signal may be changed by controlling the grayscale data signal received at the grayscale data signal terminal DA, so as to control the grayscale of the light-emitting device 20, thereby achieving low grayscale (the target grayscale is less than or equal to the first grayscale) display of the display panel 100.

In summary, through combination of the above two methods, the light-emitting device 20 may achieve full-grayscale display under a high current density, thereby improving the luminous efficiency of the light-emitting device 20, reducing the high energy consumption of the display panel 100, and improving the brightness uniformity of the display panel 100.

In addition, the signal switched between high and low levels will have a threshold loss when passing through the transistor, resulting in signal loss or writing chaos. Therefore, the signal received by the enable signal control terminal EK is a constant voltage signal. Compared with that the received signal is a signal switched between high and low levels, the constant voltage signal may accurately control turn-on and turn-off of the fourth transistor T4, so as to avoid confusion generated in turn-on and turn-off of the fourth transistor T4 caused by signal loss or writing chaos.

Moreover, the setting of the first constant voltage signal and the second constant voltage signal may allow the fourth transistor T4 to be turned on to the greatest extend and turned off. For example, the first constant voltage signal is 5 V, and the second constant voltage signal is 0 V. In this way, not only may the current of the driving current signal increase when the fourth transistor T4 is turned on, but also the leakage current may be minimized when the fourth transistor T4 is turned off, thereby significantly enhancing the contrast of the display panel 100.

Figure 17:
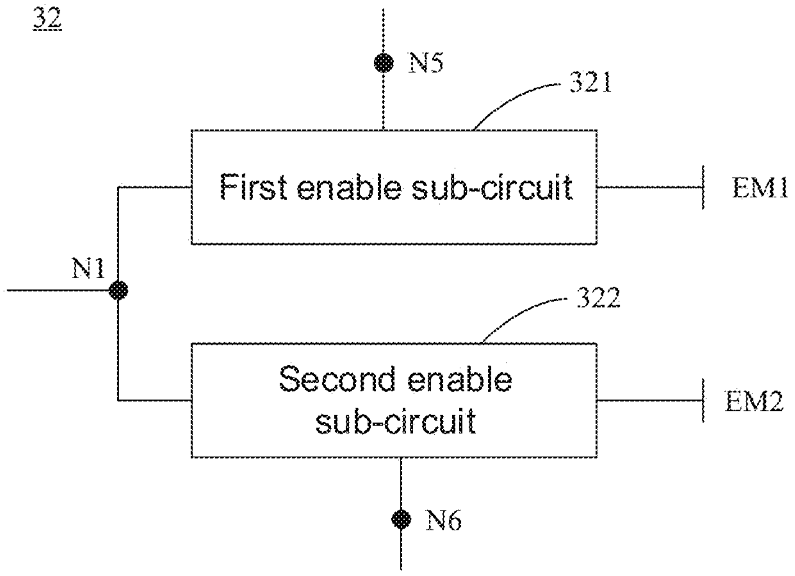
FIG. 17 is a block diagram of another control circuit, in accordance with some embodiments.

In some embodiments, referring to FIG. 17, the control circuit 32 includes a first enable sub-circuit 321 and a second enable sub-circuit 322.

For example, as shown in FIG. 17, the first enable sub-circuit 321 is coupled to a fifth node N5, the first enable signal terminal EM1 and the first node N1. The first enable sub-circuit 321 is configured to transmit the first enable signal received at the first enable signal terminal EM1 to the first node N1 in response to a signal received at the fifth node N5.

Figure 18:
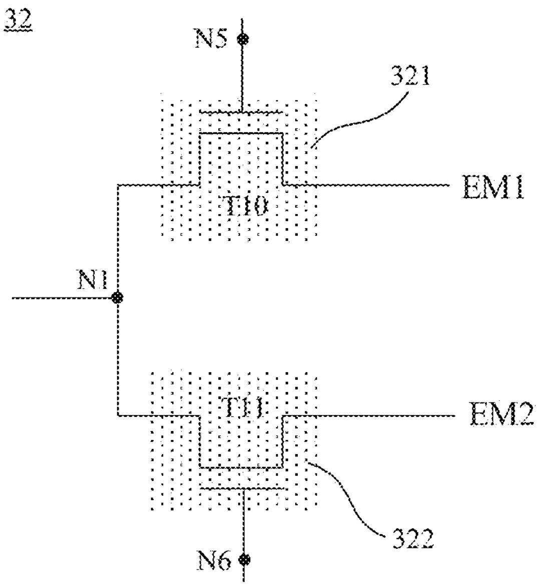
FIG. 18 is a circuit diagram of a control circuit, in accordance with some embodiments.

For example, referring to FIG. 18, the first enable sub-circuit 321 includes a tenth transistor T10.

As shown in FIG. 18, a first electrode of the tenth transistor T10 is coupled to the first enable signal terminal EM1, a second electrode of the tenth transistor T10 is coupled to the first node N1, and a control electrode of the tenth transistor T10 is coupled to the fifth node N5.

The tenth transistor T10 may be a P-type transistor or an N-type transistor. FIG. 18 shows an example where the tenth transistor T10 is an N-type transistor. In this case, in a case where a voltage of the signal received at the fifth node N5 is at a high level, the tenth transistor T10 is turned on to transmit the first enable signal received at the first enable signal terminal EM1 to the first node N1.

For example, as shown in FIG. 17, the second enable sub-circuit 322 is coupled to a sixth node N6, the second enable signal terminal EM2 and the first node N1. The second enable sub-circuit is configured to transmit the second enable signal received at the second enable signal terminal EM2 to the enable signal control terminal EK in response to a signal received at the sixth node N6.

For example, referring to FIG. 18, the second enable sub-circuit 322 includes an eleventh transistor M11.

As shown in FIG. 18, a first electrode of the eleventh transistor T11 is coupled to the second enable signal terminal EM2, a second electrode of the eleventh transistor T11 is coupled to the first node N1, and a control electrode of the eleventh transistor T11 is coupled to the sixth node N6.

The eleventh transistor T11 may be a P-type transistor or an N-type transistor. FIG. 18 shows an example where the eleventh transistor T11 is an N-type transistor. In this case, in a case where a voltage of the signal received at the sixth node N6 is at a high level, the eleventh transistor T11 is turned on to transmit the second enable signal received at the second enable signal terminal EM2 to the first node N1.

It can be understood that a circuit for transmitting a first control signal to the fifth node N5 and a second control signal to the sixth node N6 is not unique.

Figure 19:
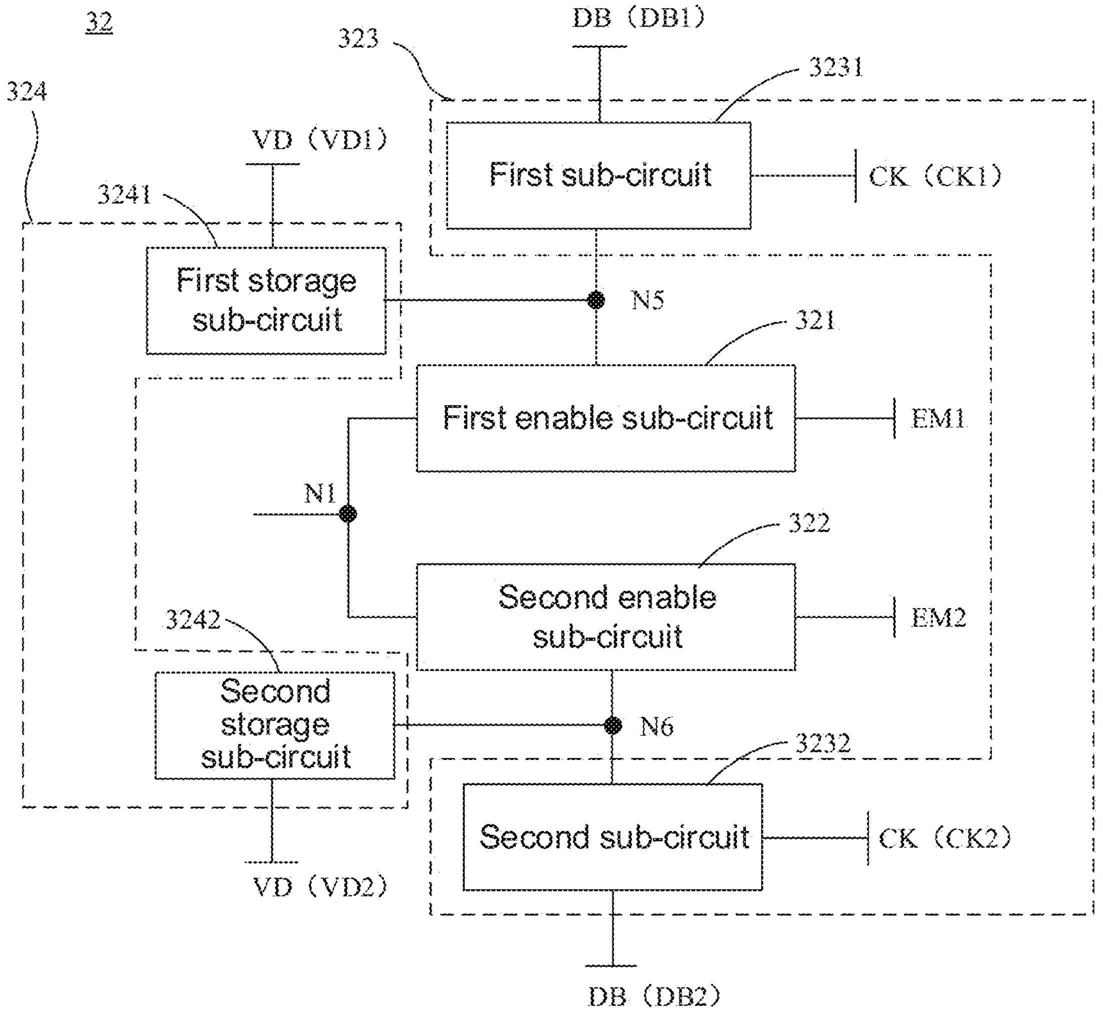
FIG. 19 is a block diagram of another control circuit, in accordance with some embodiments.
Figure 20:
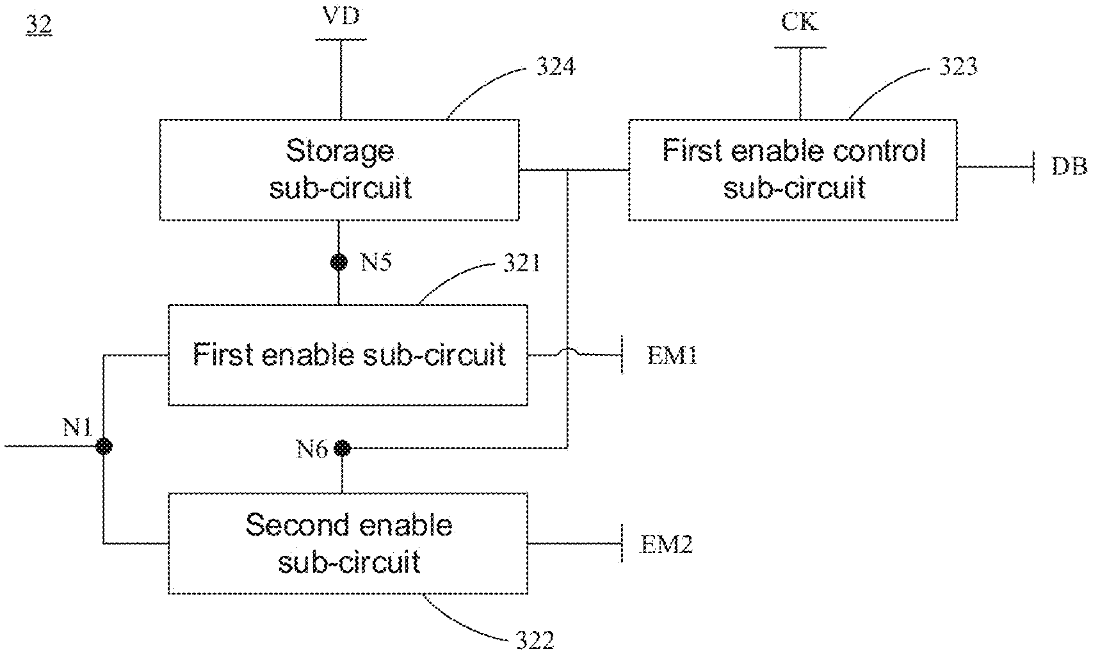
FIG. 20 is a block diagram of another control circuit, in accordance with some embodiments.

In some embodiments, referring to FIGS. 19 and 20, the control circuit 32 further includes a first enable control sub-circuit 323 and a storage sub-circuit 324.

For example, as shown in FIGS. 19 and 20, the first enable control sub-circuit 323 is coupled to a control data signal terminal DB, the control signal terminal CK, the fifth node N5 and the sixth node N6.

The first enable control sub-circuit 323 is configured to transmit a control data signal received at the control data signal terminal DB to the fifth node N5 and the sixth node N6 in response to a control signal received at the control signal terminal CK.

For example, as shown in FIGS. 19 and 20, the storage sub-circuit 324 is coupled to a voltage signal terminal VD, the fifth node N5 and the sixth node N6.

The storage sub-circuit is configured to receive and store control data signals at the fifth node N5 and the sixth node N6 to keep voltages stored at the fifth node N5 and the sixth node N6 stable.

It will be noted that a voltage signal received at the voltage signal terminal VD is a constant voltage. For example, the voltage signal received at the voltage signal terminal VD is a direct current low-level signal or a direct current high-level signal, and the embodiments of the present disclosure are not limited specifically.

Figure 21:
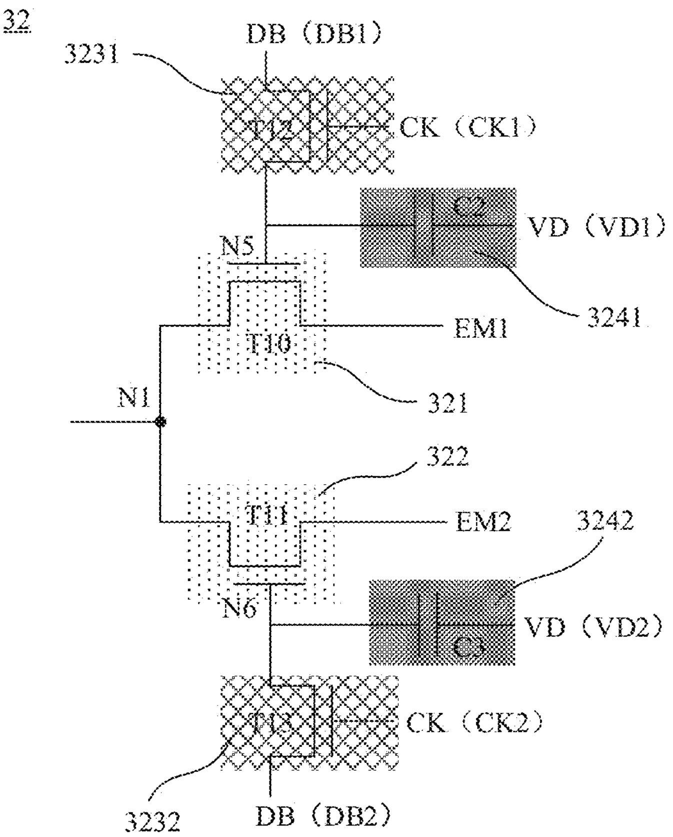
FIG. 21 is a circuit diagram of another control circuit, in accordance with some embodiments.

In some examples, referring to FIGS. 19 and 21, the transistors included in the first enable sub-circuit 321 and the second enable sub-circuit 322 have the same conduction type. For example, the tenth transistor T10 and the eleventh transistor T11 are both N-type transistors or both P-type transistors.

Some embodiments of the present disclosure will be exemplarily described below by taking an example where the tenth transistor T10 and the eleventh transistor T11 are both N-type transistors, but the embodiments of the present disclosure are not limited thereto.

In this case, as shown in FIGS. 19 and 21, the control signal terminal CK includes a first control signal terminal CK1 and a second control signal terminal CK2, and the first enable control sub-circuit 323 includes a first sub-circuit 3231 and a second sub-circuit 3232.

For example, as shown in FIG. 19, the first sub-circuit 3231 is coupled to the fifth node N5, the first control signal terminal CK1 and a first control data signal terminal DB1. The first sub-circuit is configured to transmit a first control data signal received at the first control data signal terminal DB1 to the fifth node N5 in response to a first control signal received at the first control signal terminal CK1.

For example, referring to FIG. 21, the first sub-circuit 3231 includes a twelfth transistor T12.

As shown in FIG. 21, a first electrode of the twelfth transistor T12 is coupled to the first control data signal terminal DB1, a second electrode of the twelfth transistor T12 is coupled to the fifth node N5, and a control electrode of the twelfth transistor T12 is coupled to the first control signal terminal CK1.

The twelfth transistor T12 may be a P-type transistor or an N-type transistor. Some embodiments of the present disclosure will be exemplarily described below by taking an example where the twelfth transistor T12 is an N-type transistor, but the embodiments of the present disclosure are not limited thereto.

In this case, in a case where a voltage of the first control signal received at the first control signal terminal CK1 is at a high level, the twelfth transistor T12 is turned on to transmit the first control data signal received at the first control data signal terminal DB1 to the fifth node N5.

In addition, as shown in FIGS. 19 and 21, the voltage signal terminal VD includes a first voltage signal terminal VD1 and a second voltage signal terminal VD2, and the storage sub-circuit 324 includes a first storage sub-circuit 3241 and a second storage sub-circuit 3242.

For example, as shown in FIG. 19, the first storage sub-circuit 3241 is coupled to the first voltage signal terminal VD1 and the fifth node N5, and the first storage sub-circuit is configured to receive and store the first control data signal at the fifth node N5.

For example, as shown in FIG. 21, the first storage sub-circuit 3241 includes a second capacitor C2.

As shown in FIG. 21, a first electrode plate of the second capacitor C2 is coupled to the fifth node N5, and a second electrode plate of the second capacitor C2 is coupled to the first voltage signal terminal VD1.

In this case, as shown in FIGS. 21 and 22, in a case where a voltage of the first control signal received at the first control signal terminal CK1 is at a high level, the twelfth transistor T12 is turned on to transmit the first control data signal received at the first control data signal terminal DB1 to the fifth node N5, and the second capacitor C2 receives and stores the first control data signal at the fifth node N5 to keep a voltage at the fifth node N5 stable.

For example, as shown in FIG. 19, the second sub-circuit 3232 is coupled to the sixth node N6, the second control signal terminal CK2 and a second control data signal terminal DB2. The second sub-circuit 3232 is configured to transmit a second control data signal received at the second control data signal terminal DB2 to the sixth node N6 in response to a second control signal received at the second control signal terminal CK2.

For example, referring to FIG. 21, the second sub-circuit 3232 includes a thirteenth transistor T13.

As shown in FIG. 21, a first electrode of the thirteenth transistor T13 is coupled to the second control data signal terminal DB2, a second electrode of the thirteenth transistor T13 is coupled to the sixth node N6, and a control electrode of the thirteenth transistor T13 is coupled to the second control signal terminal CK2.

The thirteenth transistor T13 may be a P-type transistor or an N-type transistor. Some embodiments of the present disclosure will be exemplarily described below by taking an example where the thirteenth transistor T13 is an N-type transistor, but the embodiments of the present disclosure are not limited thereto.

In this case, in a case where a voltage of the second control signal received at the second control signal terminal CK2 is at a high level, the thirteenth transistor T13 is turned on to transmit the second control data signal received at the second control data signal terminal DB2 to the sixth node N6.

For example, as shown in FIG. 19, the second storage sub-circuit 3242 is coupled to the second voltage signal terminal VD2 and the sixth node N6, and the second storage sub-circuit is configured to receive and store the second control data signal at the sixth node N6.

For example, as shown in FIG. 21, the second storage sub-circuit 3242 includes a third capacitor C3.

As shown in FIG. 21, a first electrode plate of the third capacitor C3 is coupled to the sixth node N6, and a second electrode plate of the third capacitor C3 is coupled to the second voltage signal terminal VD2.

In this case, as shown in FIGS. 21 and 22, in a case where a voltage of the second control signal received at the second control signal terminal CK2 is at a high level, the thirteenth transistor T13 is turned on to transmit the second control data signal received at the second control data signal terminal DB2 to the sixth node N6, and the third capacitor C3 receives and stores the second control data signal at the sixth node N6 to keep a voltage at the sixth node N6 stable.

It can be understood that, as shown in FIGS. 21 and 22, in a case where the twelfth transistor T12 and the thirteenth transistor T13 are both turned on, for example, the first control signal terminal CK1 and the second control signal terminal CK2 receive the same signal to simplify the circuit. In this case, of the first control data signal and the second control data signal, one is at a high level and the other is at a low level, so that one of the tenth transistor T10 and the eleventh transistor T11 is turned on, so as to ensure that the first node N1 receives the first enable signal or the second enable signal.

In addition, in a case where one of the twelfth transistor T12 and the thirteenth transistor T13 is turned on and the other thereof is turned off, for example, the first control signal terminal CK1 and the second control signal terminal CK2 receive different signals. In this case, the first control data signal terminal DB1 and the second control data signal terminal DB2 may receive the same signal to simplify the circuit.

Figure 31:
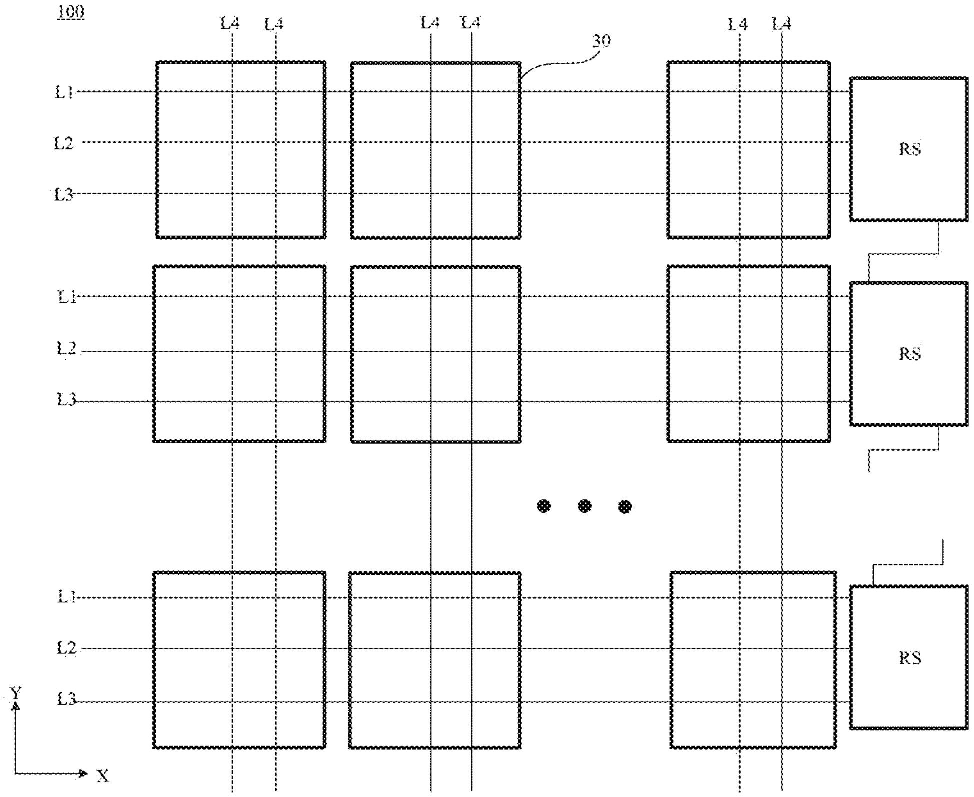
FIG. 31 is a structural diagram of another display panel, in accordance with some embodiments.
Figure 32:
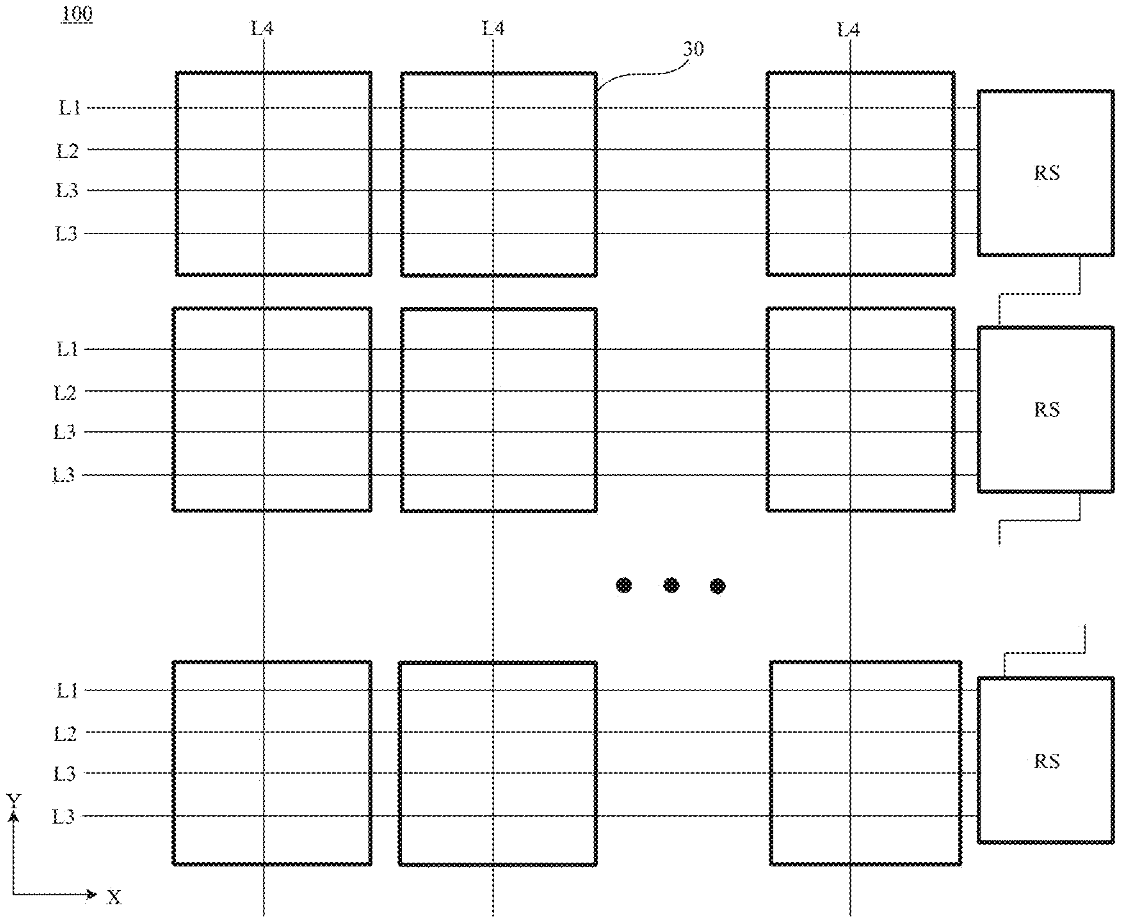
FIG. 32 is a structural diagram of another display panel, in accordance with some embodiments.
Figure 33:
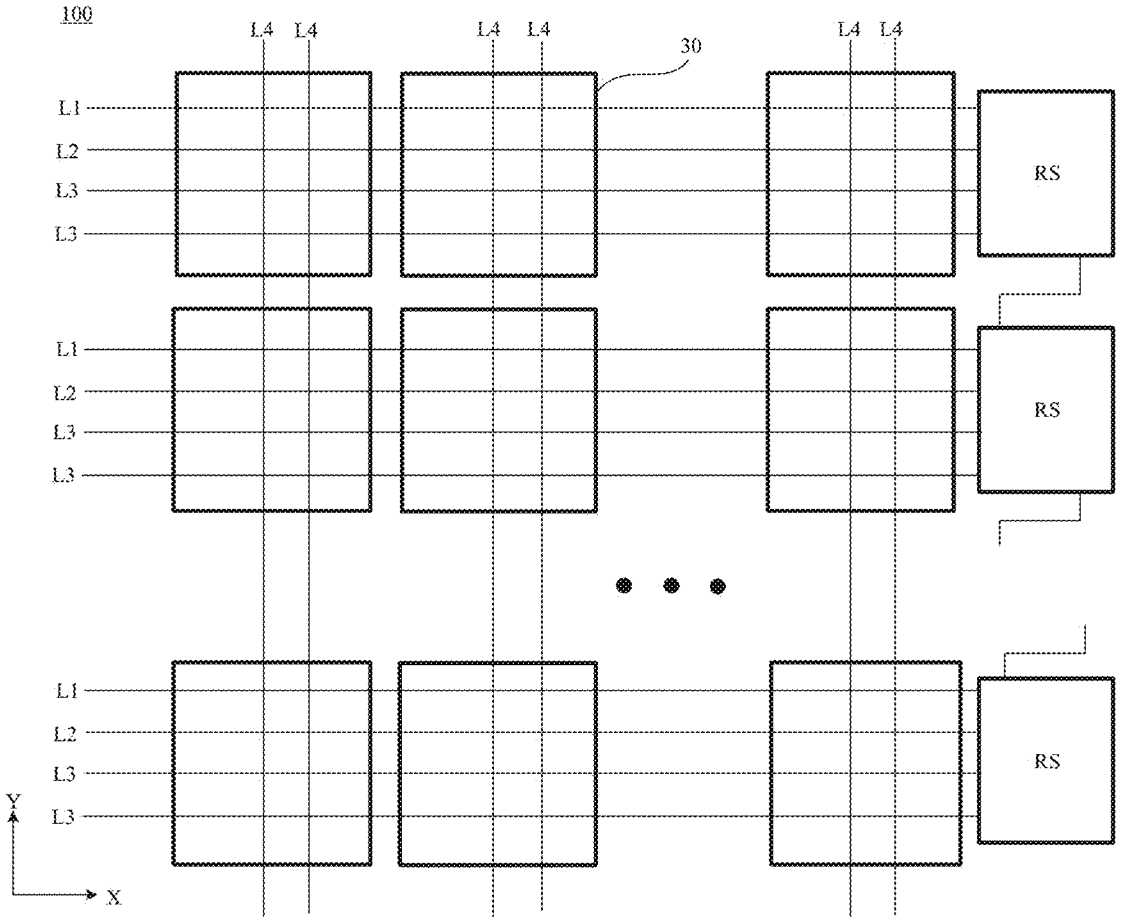
FIG. 33 is a structural diagram of another display panel, in accordance with some embodiments.

On this basis, as shown in FIGS. 31, 32 and 33, the display panel 100 may, for example, further include a plurality of first signal lines L1, a plurality of second signal lines L2, a plurality of third signal lines L3 and a plurality of fourth signal lines L4. The first signal line L1 may be configured to transmit the first enable signal to pixel circuits 30. The second signal line L2 may be configured to transmit the second enable signal to pixel circuits 30. The third signal line L3 may be configured to transmit a control signal to pixel circuits 30. The fourth signal line L4 may be configured to transmit a control data signal to pixel circuits 30.

The first signal line L1, the second signal line L2 and the third signal line L3 may, for example, extend in the first direction X, and the fourth signal line L4 may, for example, extend in the second direction Y.

In some examples, as shown in FIGS. 22, 31, 32 and 33, first enable signal terminals EM1 of pixel circuits 30 in a row is coupled to a first signal line L1 in the plurality of first signal lines L1, and second enable signal terminals EM2 of pixel circuits 30 in a row is coupled to a second signal line L2 in the plurality of second signal lines L2.

As shown in FIGS. 22, 31 and 33, in a case where the first control signal terminal CK1 and the second control signal terminal CK2 receive the same signal, the first control data signal terminals DB1 and the second control data signal terminals DB2 of pixel circuits 30 in a column are each coupled to a fourth signal line L4 in the plurality of fourth signal lines L4.

On this basis, the first control signal terminals CK1 and the second control signal terminals CK2 of pixel circuits 30 in a row may each be coupled to a third signal line L3 in the plurality of third signal lines L3, or may be coupled to the same third signal line L3 in the plurality of third signal lines L3.

For example, as shown in FIGS. 22 and 31, the first control signal terminals CK1 and the second control signal terminals CK2 of pixel circuits 30 in a row are coupled to the same third signal line L3 in the plurality of third signal lines L3. In this way, the number of signal lines coupled to pixel circuits 30 in each row may be reduced, so that the display panel 100 may have a loose wiring space, thereby simplifying the circuit and being beneficial to achieving high resolution of the display panel 100.

As shown in FIGS. 22, 32 and 33, in a case where the first control signal terminal CK1 and the second control signal terminal CK2 receive different signals, the first control signal terminals CK1 and the second control signal terminals CK2 of pixel circuits 30 in a row are each coupled to a third signal line L3 in the plurality of third signal lines L3.

On this basis, the first control data signal terminals DB1 and the second control data signal terminals DB2 of pixel circuits 30 in a column may each be coupled to a fourth signal line L4 in the plurality of fourth signal lines L4, or may be coupled to the same fourth signal line L4 in the plurality of fourth signal lines L4.

For example, as shown in FIGS. 22 and 32, the first control data signal terminals DB1 and the second control data signal terminals DB2 of pixel circuits 30 in a column are coupled to the same fourth signal line L4 in the plurality of fourth signal lines L4. In this way, the number of signal lines coupled to pixel circuits 30 in each row may be reduced, so that the display panel 100 may have a loose wiring space, thereby simplifying the circuit and being beneficial to achieving high resolution of the display panel 100.

In addition, as shown in FIGS. 31 to 33, the display panel 100 may further include a gate driver circuit disposed on a side of the substrate 10 and located in the peripheral area BB. The gate driver circuit includes a plurality of shift register circuits RS that are cascaded. Each shift register circuit RS is electrically connected to a row of pixel circuits 30.

For example, as shown in FIGS. 22 and 31 to 33, each shift register circuit RS is coupled to a first signal line L1, a second signal line L2 and a third signal line L3, that is, each shift register circuit RS is coupled to first enable signal terminals EM1, second enable signal terminals EM2 and control signal terminals CK of pixel circuits 30 in a row, and is configured to transmit the first enable signal, the second enable signal and the control signal to the coupled pixel circuits 30.

Figure 23:
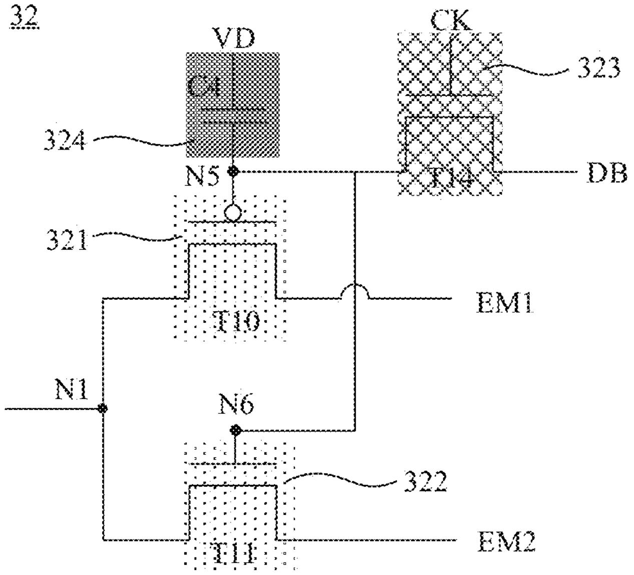
FIG. 23 is a circuit diagram of another control circuit, in accordance with some embodiments.

In some other examples, referring to FIGS. 20 and 23, the transistors included in the first enable sub-circuit 321 and the second enable sub-circuit 322 have inverse conduction types. For example, of the tenth transistor T10 and the eleventh transistor T11, one is a P-type transistor and the other is an N-type transistor.

Some embodiments of the present disclosure will be exemplarily described below by taking an example where the tenth transistor T10 is a P-type transistor and the eleventh transistor T11 is an N-type transistor, but the embodiments of the present disclosure are not limited thereto.

On this basis, referring to FIG. 23, the first enable control sub-circuit 323 includes a fourteenth transistor T14.

As shown in FIG. 23, a first electrode of the fourteenth transistor T14 is coupled to the control data signal terminal DB, a second electrode of the fourteenth transistor T14 is coupled to both the fifth node N5 and the sixth node N6, and a control electrode of the fourteenth transistor T14 is coupled to the control signal terminal CK.

The fourteenth transistor T14 may be a P-type transistor or an N-type transistor. Some embodiments of the present disclosure will be exemplarily described below by taking an example where the fourteenth transistor T14 is an N-type transistor, but the embodiments of the present disclosure are not limited thereto.

In this case, in a case where a voltage of the control signal received at the control signal terminal CK is at a high level, the fourteenth transistor T14 is turned on to transmit the control data signal received at the control data signal terminal DB to the fifth node N5 and the sixth node N6.

Here, the control signal terminal CK may be coupled to the scan signal terminal G to simplify the circuit. For example, in a case where the sixth transistor T6 is an N-type transistor, the control signal terminal CK may be coupled to the second scan signal terminal G2.

In addition, referring to FIG. 23, the storage sub-circuit 324 includes a fourth capacitor C4.

As shown in FIG. 23, a first electrode plate of the fourth capacitor C4 is coupled to the fifth node N5 and the sixth node N6, and a second electrode plate of the fourth capacitor C4 is coupled to the voltage signal terminal VD.

In this case, as shown in FIG. 23, in a case where a voltage of the control signal received at the control signal terminal CK is at a high level, the fourteenth transistor T14 is turned on to transmit the control data signal received at the control data signal terminal DB to the fifth node N5 and the sixth node N6, and the fourth capacitor C4 receives and stores the control data signal at the fifth node N5 and the sixth node N6 to keep a voltage at the fifth node N5 and the sixth node N6 stable.

Figure 34:
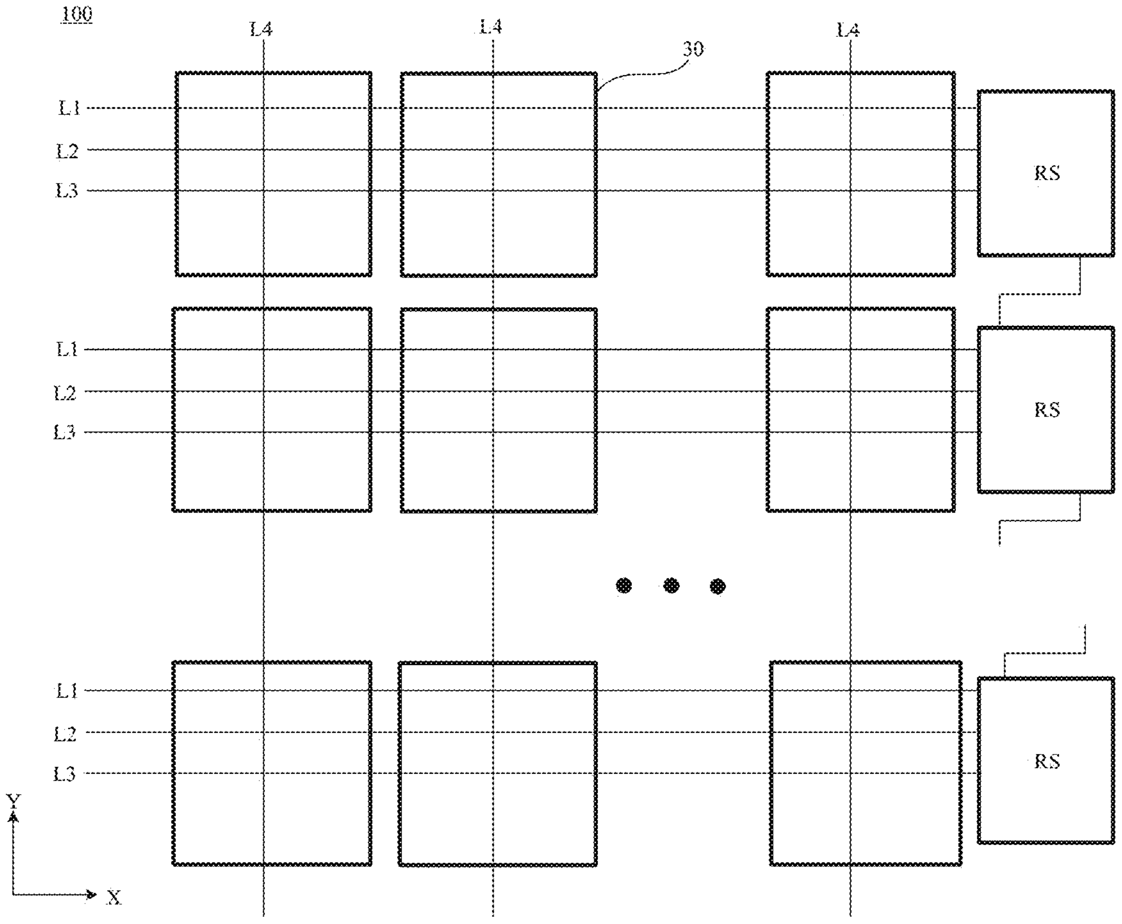
FIG. 34 is a structural diagram of another display panel, in accordance with some embodiments.

On this basis, as shown in FIG. 34, the display panel 100 may, for example, further include a plurality of first signal lines L1, a plurality of second signal lines L2, a plurality of third signal lines L3 and a plurality of fourth signal lines L4. The first signal line L1 may be configured to transmit the first enable signal to pixel circuits 30. The second signal line L2 may be configured to transmit the second enable signal to pixel circuits 30. The third signal line L3 may be configured to transmit a control signal to pixel circuits 30. The fourth signal line L4 may be configured to transmit a control data signal to pixel circuits 30.

The first signal line L1, the second signal line L2 and the third signal line L3 may, for example, extend in the first direction X, and the fourth signal line L4 may, for example, extend in the second direction Y.

Figure 24:
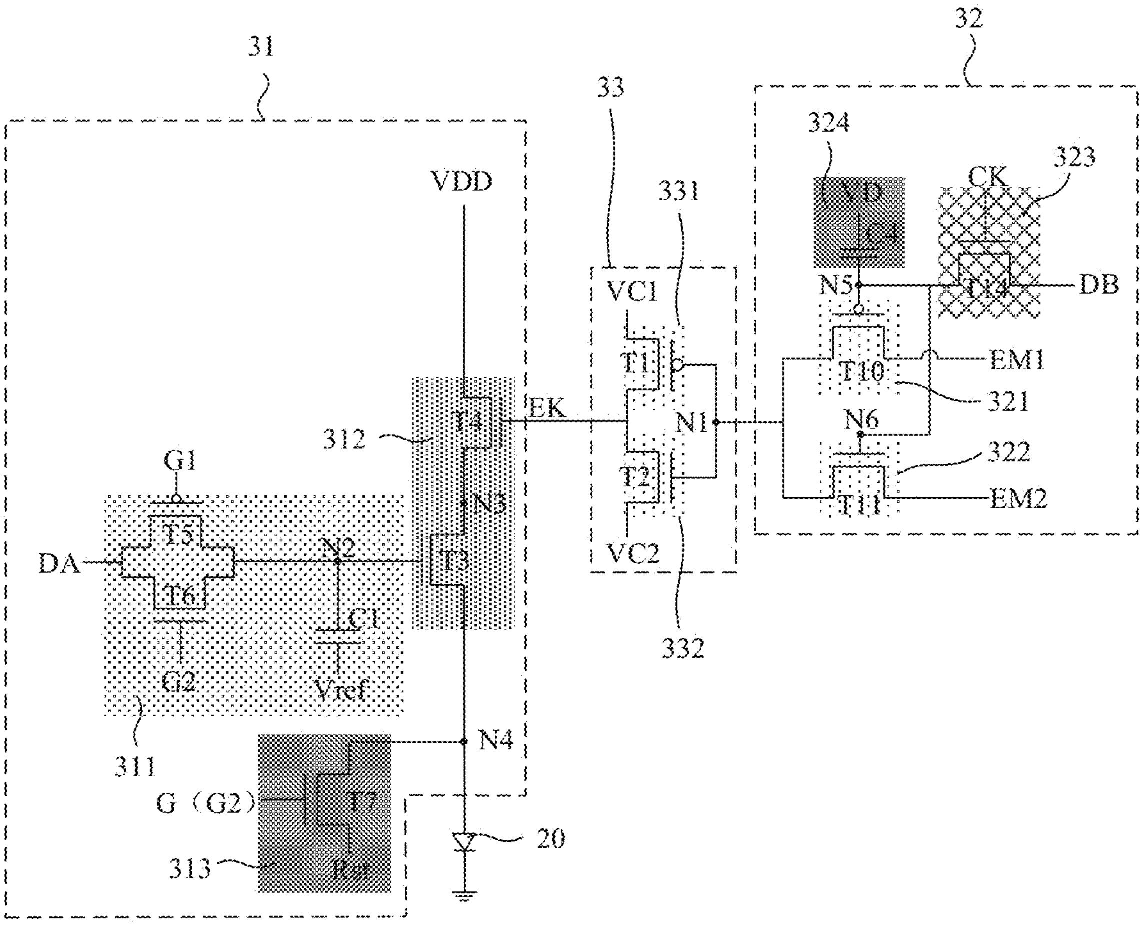
FIG. 24 is a circuit diagram of another pixel circuit, in accordance with some embodiments.

In some examples, as shown in FIGS. 24 and 34, first enable signal terminals EM1 of pixel circuits 30 in a row is coupled to a first signal line L1 in the plurality of first signal lines L1, and second enable signal terminals EM2 of pixel circuits 30 in a row is coupled to a second signal line L2 in the plurality of second signal lines L2. Control signal terminals CK of pixel circuits 30 in a row may be coupled to a third signal line L3 in the plurality of third signal lines L3. Control data signal terminals DB of pixel circuits 30 in a column may be coupled to a fourth signal line L4 in the plurality of fourth signal lines L4.

With such a provision, the number of signal lines coupled to pixel circuits 30 in each row may be reduced, so that the display panel 100 may have a loose wiring space, thereby simplifying the circuit and being beneficial to achieving high resolution of the display panel 100.

In addition, as shown in FIG. 34, the display panel 100 may further include a gate driver circuit disposed on a side of the substrate 10 and located in the peripheral area BB. The gate driver circuit includes a plurality of shift register circuits RS that are cascaded. Each shift register circuit RS is electrically connected to a row of pixel circuits 30.

For example, as shown in FIGS. 24 and 34, each shift register circuit RS is coupled to a first signal line L1, a second signal line L2 and a third signal line L3, that is, each shift register circuit RS is coupled to first enable signal terminals EM1, second enable signal terminals EM2 and control signal terminals CK of pixel circuits 30 in a row, and is configured to transmit the first enable signal, the second enable signal and the control signal to the coupled pixel circuits 30.

Figure 25:
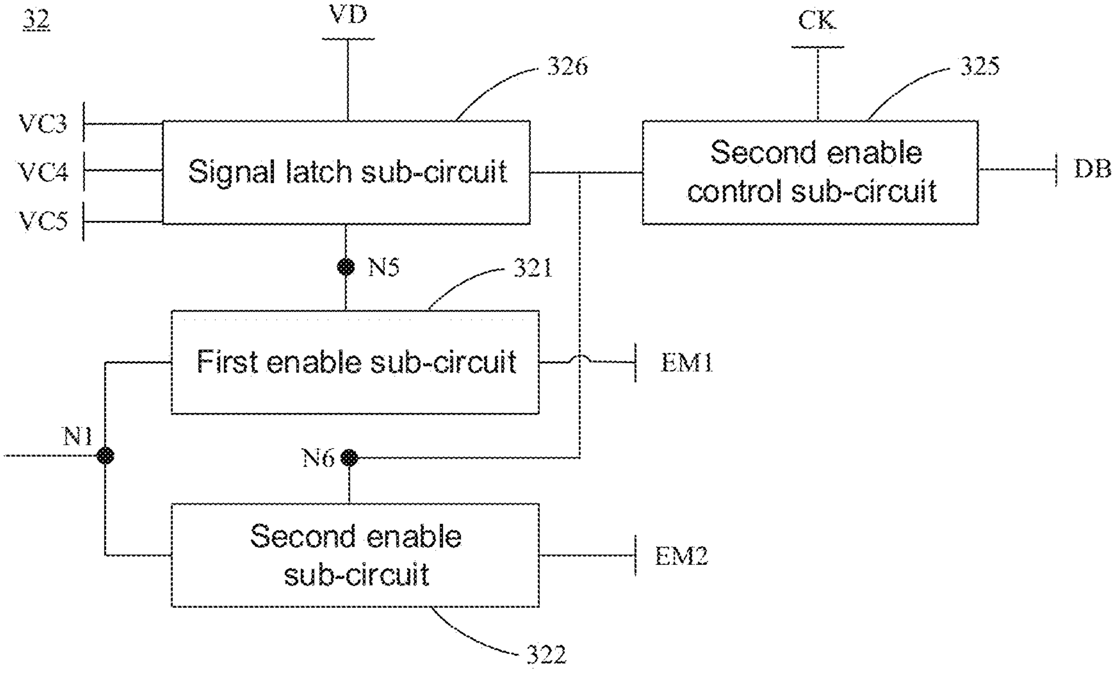
FIG. 25 is a block diagram of another control circuit, in accordance with some embodiments.

In some other embodiments, referring to FIG. 25, the control circuit 32 further includes a second enable control sub-circuit 325 and a signal latch sub-circuit 326.

For example, as shown in FIG. 25, the second enable control sub-circuit 325 is coupled to the control data signal terminal DB, the control signal terminal CK and the sixth node N6. The second enable control sub-circuit is configured to transmit the control data signal received at the control data signal terminal DB to the sixth node N6 in response to the control signal received at the control signal terminal CK.

Figure 26:
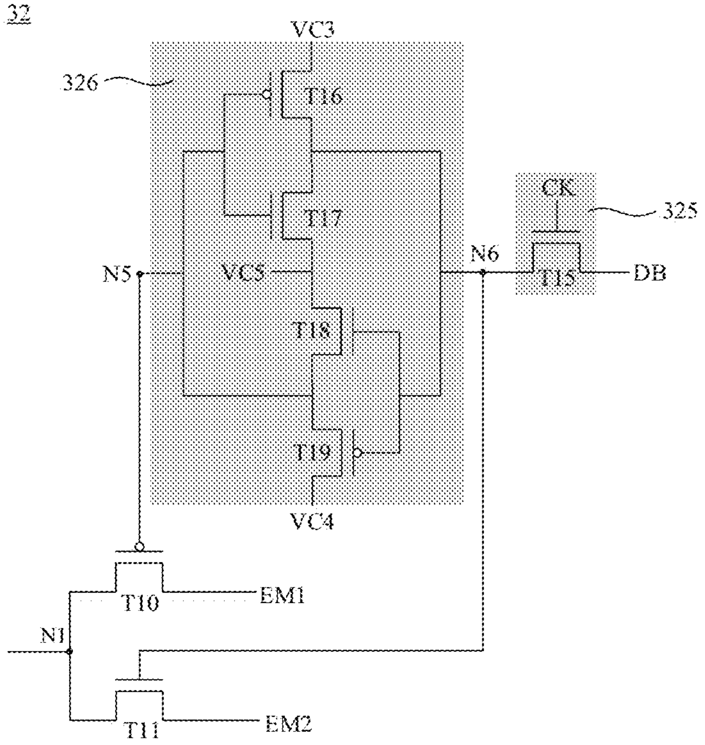
FIG. 26 is a circuit diagram of another control circuit, in accordance with some embodiments.

For example, referring to FIG. 26, the second enable control sub-circuit 325 includes a fifteenth transistor T15.

As shown in FIG. 26, a first electrode of the fifteenth transistor T15 is coupled to the control data signal terminal DB, a second electrode of the fifteenth transistor T15 is coupled to the sixth node N6, and a control electrode of the fifteenth transistor T15 is coupled to the control signal terminal CK.

The fifteenth transistor T15 may be a P-type transistor or an N-type transistor. Some embodiments of the present disclosure will be exemplarily described below by taking an example where the fifteenth transistor T15 is an N-type transistor, but the embodiments of the present disclosure are not limited thereto.

In this case, in a case where a voltage of the control data signal received at the control data signal terminal DB is at a high level, the fifteenth transistor T15 is turned on to transmit the control data signal received at the control data signal terminal DB to the sixth node N6.

For example, as shown in FIG. 25, the signal latch sub-circuit 326 is coupled to a third constant voltage terminal VC3, a fourth constant voltage terminal VC4, a fifth constant voltage terminal VC5, the fifth node N5 and the sixth node N6. The signal latch sub-circuit is configured to, in response to the voltage at the sixth node N6, transmit a fourth constant voltage signal received at the fourth constant voltage terminal VC4 or a fifth constant voltage signal received at the fifth constant voltage terminal VC5 to the fifth node N5.

For example, referring to FIG. 26, the signal latch sub-circuit 326 includes a sixteenth transistor T16, a seventeenth transistor T17, an eighteenth transistor T18 and a nineteenth transistor T19.

As shown in FIG. 26, a first electrode of the sixteenth transistor T16 is coupled to the third constant voltage terminal VC3, a second electrode of the sixteenth transistor T16 is coupled to the sixth node N6, and a control electrode of the sixteenth transistor T16 is coupled to the fifth node N5.

As shown in FIG. 26, a first electrode of the seventeenth transistor T17 is coupled to the sixth node N6, a second electrode of the seventeenth transistor T17 is coupled to the fifth constant voltage terminal VC5, and a control electrode of the seventeenth transistor T17 is coupled to the fifth node N5.

As shown in FIG. 26, a first electrode of the eighteenth transistor T18 is coupled to the fifth constant voltage terminal VC5, a second electrode of the eighteenth transistor T18 is coupled to the fifth node N5, and a control electrode of the eighteenth transistor T18 is coupled to the sixth node N6.

As shown in FIG. 26, a first electrode of the nineteenth transistor T19 is coupled to the fourth constant voltage terminal VC4, a second electrode of the nineteenth transistor T19 is coupled to the fifth node N5, and a control electrode of the nineteenth transistor T19 is coupled to the sixth node N6.

In this case, there is no need to provide a capacitor in the signal latch sub-circuit 326. Therefore, an area occupied by the pixel circuits 30 may be reduced, thereby increasing the pixel density (pixels per inch, PPI) and achieving rather high PPI display.

As shown in FIG. 26, the sixteenth transistor T16 and the seventeenth transistor T17 have inverse conduction types, and the eighteenth transistor T18 and the nineteenth transistor T19 have inverse conduction types.

For example, referring to FIG. 26, of the sixteenth transistor T16 and the seventeenth transistor T17, one is a P-type transistor and the other is an N-type transistor. Of the eighteenth transistor T18 and the nineteenth transistor T19, one is a P-type transistor and the other is an N-type transistor.

In addition, constant voltage signals received by the third constant voltage terminal VC3, the fourth constant voltage terminal VC4 and the fifth constant voltage terminal VC5 are at high levels or at low levels, which may be set according to the tenth transistor T10, the eleventh transistor T11, the sixteenth transistor T16, the seventeenth transistor T17, the eighteenth transistor T18 and the nineteenth transistor T19.

Some embodiments of the present disclosure will be exemplarily described below by taking an example where the sixteenth transistor T16 and the eighteenth transistor T18 are P-type transistors, and the seventeenth transistor T17 and the nineteenth transistor T19 are N-type transistors, but the embodiments of the present disclosure are not limited thereto.

On this basis, the tenth transistor T10 and the eleventh transistor T11 may have the same conduction type or inverse conduction types.

Figure 27:
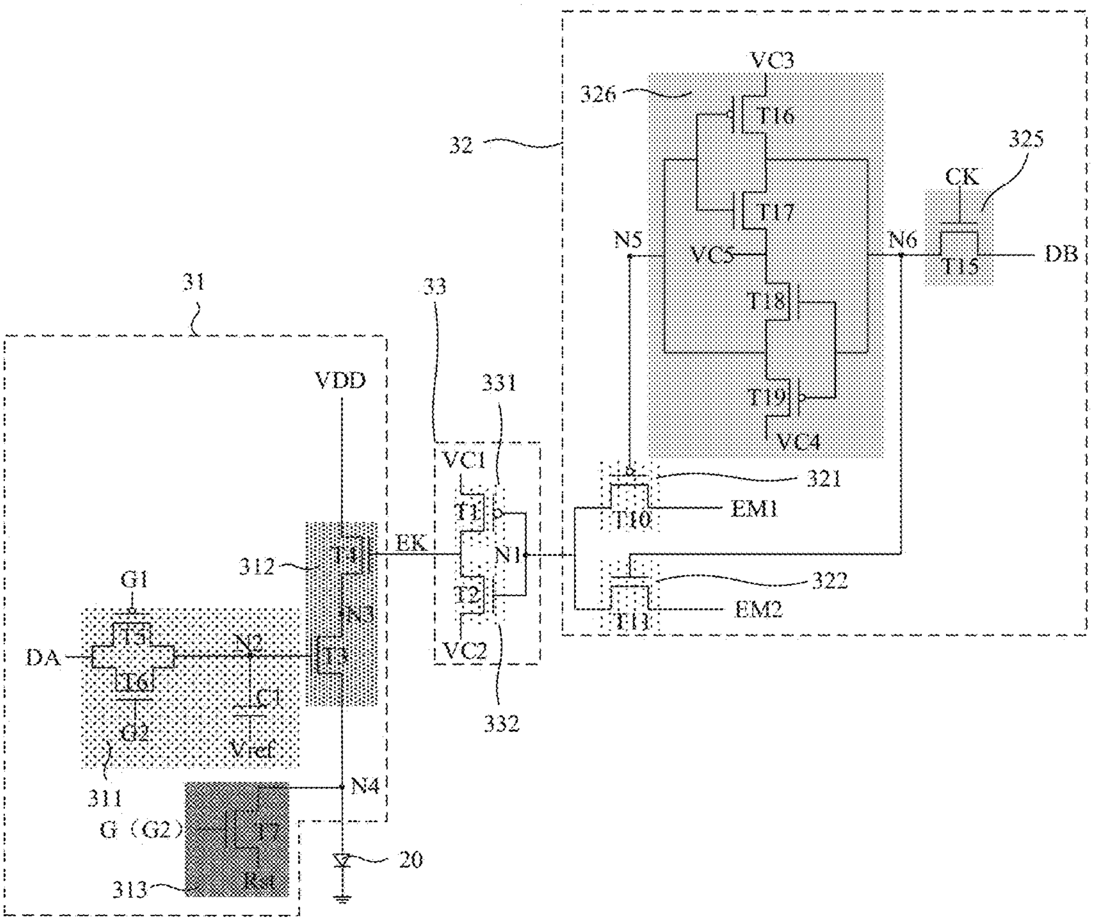
FIG. 27 is a circuit diagram of another pixel circuit, in accordance with some embodiments.

In some examples, as shown in FIGS. 26 and 27, the tenth transistor T10 and the eleventh transistor T11 have inverse conduction types. For example, the tenth transistor T10 is a P-type transistor, and the eleventh transistor T11 is an N-type transistor.

In a case where a voltage of the second control data signal received at the sixth node N6 is at a high level, the eighteenth transistor T18 is turned on, the nineteenth transistor T19 is turned off, and the fifth constant voltage signal received at the fifth constant voltage terminal VC5 is transmitted to the fifth node N5. Here, the fifth constant voltage signal received at the fifth constant voltage terminal VC5 is at a high level, so that the tenth transistor T10 is turned off.

In this case, the voltage at the fifth node N5 is at a high level, the sixteenth transistor T16 is turned off, the seventeenth transistor T17 is turned on, and the fifth constant voltage signal received at the fifth constant voltage terminal VC5 is transmitted to the sixth node N6 to keep the voltage at the sixth node N6 in a high level state, so as to ensure that the eleventh transistor T11 and the eighteenth transistor T18 are in turn-on states, and the nineteenth transistor T19 is in a turn-off state.

In a case where a voltage of the second control data signal received at the sixth node N6 is at a low level, the eighteenth transistor T18 is turned off, the nineteenth transistor T19 is turned on, and the fourth constant voltage signal received at the fourth constant voltage terminal VC4 is transmitted to the fifth node N5. Here, the fourth constant voltage signal received at the fourth constant voltage terminal VC4 is at a low level, so that the tenth transistor T10 is turned on.

In this case, the voltage at the fifth node N5 is at a low level, the sixteenth transistor T16 is turned on, the seventeenth transistor T17 is turned off, and a third constant voltage signal received at the third constant voltage terminal VC3 is transmitted to the sixth node N6. Here, the third constant voltage signal received at the third constant voltage terminal VC3 is at a low level to keep the voltage at the sixth node N6 in a low level state, so as to ensure that the eleventh transistor T11 and the eighteenth transistor T18 are in turn-off states, and the nineteenth transistor T19 is in a turn-on state.

Figure 28:
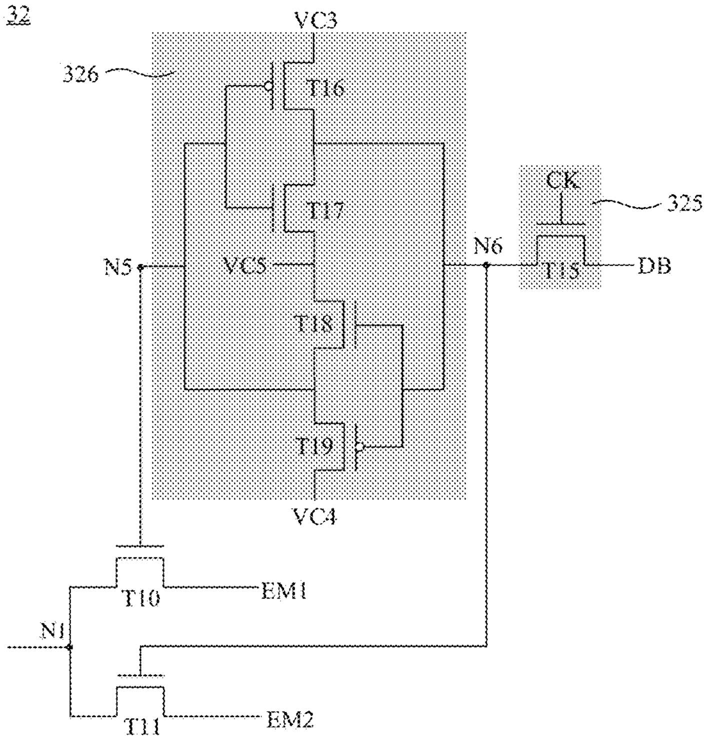
FIG. 28 is a circuit diagram of another control circuit, in accordance with some embodiments.
Figure 29:
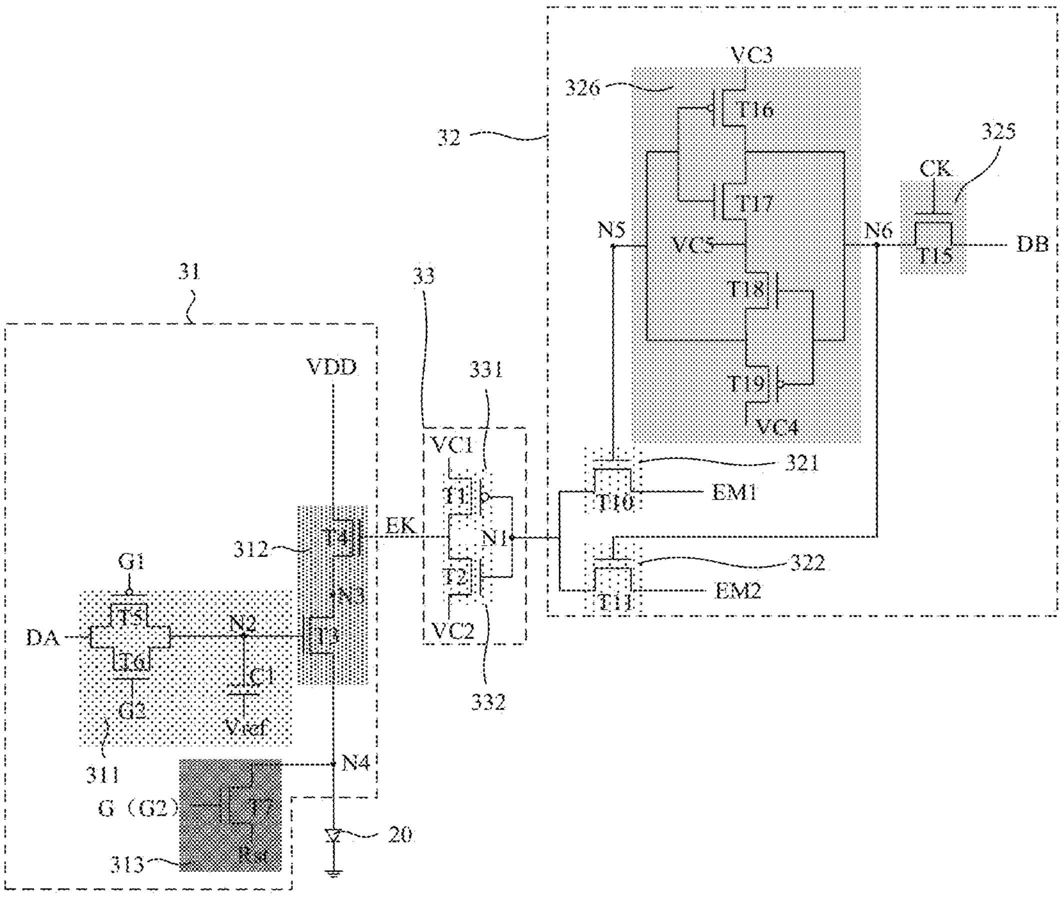
FIG. 29 is a circuit diagram of another pixel circuit, in accordance with some embodiments.

In some other examples, as shown in FIGS. 28 and 29, the tenth transistor T10 and the eleventh transistor T11 have the same conduction type. For example, the tenth transistor T10 and the eleventh transistor T11 are both N-type transistors.

In a case where a voltage of the second control data signal received at the sixth node N6 is at a high level, the eighteenth transistor T18 is turned on, the nineteenth transistor T19 is turned off, and the fifth constant voltage signal received at the fifth constant voltage terminal VC5 is transmitted to the fifth node N5. Here, the fifth constant voltage signal received at the fifth constant voltage terminal VC5 is at a low level, so that the tenth transistor T10 is turned off.

In this case, the voltage at the fifth node N5 is at a low level, the sixteenth transistor T16 is turned on, the seventeenth transistor T17 is turned off, and the third constant voltage signal received at the third constant voltage terminal VC3 is transmitted to the sixth node N6. Here, the third constant voltage signal received at the third constant voltage terminal VC3 is at a high level to keep the voltage at the sixth node N6 in a high level state, so as to ensure that the eleventh transistor T11 and the eighteenth transistor T18 are in turn-on states, and the nineteenth transistor T19 is in a turn-off state.

In a case where a voltage of the second control data signal received at the sixth node N6 is at a low level, the eighteenth transistor T18 is turned off, the nineteenth transistor T19 is turned on, and the fourth constant voltage signal received at the fourth constant voltage terminal VC4 is transmitted to the fifth node N5. Here, the fourth constant voltage signal received at the fourth constant voltage terminal VC4 is at a high level, so that the tenth transistor T10 is turned on.

In this case, the voltage at the fifth node N5 is at a high level, the sixteenth transistor T16 is turned off, the seventeenth transistor T17 is turned on, and the fifth constant voltage signal received at the fifth constant voltage terminal VC5 is transmitted to the sixth node N6. Here, the fifth constant voltage signal received at the fifth constant voltage terminal VC5 is at a low level to keep the voltage at the sixth node N6 in a low level state, so as to ensure that the eleventh transistor T11 and the eighteenth transistor T18 are in turn-off states, and the nineteenth transistor T19 is in a turn-on state.

On this basis, as shown in FIG. 34, the display panel 100 may, for example, further include a plurality of first signal lines L1, a plurality of second signal lines L2, a plurality of third signal lines L3 and a plurality of fourth signal lines L4. The first signal line L1 may be configured to transmit the first enable signal to pixel circuits 30. The second signal line L2 may be configured to transmit the second enable signal to pixel circuits 30. The third signal line L3 may be configured to transmit a control signal to pixel circuits 30. The fourth signal line L4 may be configured to transmit a control data signal to pixel circuits 30.

The first signal line L1, the second signal line L2 and the third signal line L3 may, for example, extend in the first direction X, and the fourth signal line L4 may, for example, extend in the second direction Y.

In some examples, as shown in FIGS. 27, 29 and 34, first enable signal terminals EM1 of pixel circuits 30 in a row is coupled to a first signal line L1 in the plurality of first signal lines L1, and second enable signal terminals EM2 of pixel circuits 30 in a row is coupled to a second signal line L2 in the plurality of second signal lines L2. Control signal terminals CK of pixel circuits 30 in a row may be coupled to a third signal line L3 in the plurality of third signal lines L3. Control data signal terminals DB of pixel circuits 30 in a column may be coupled to a fourth signal line L4 in the plurality of fourth signal lines L4.

With such a provision, the number of signal lines coupled to pixel circuits 30 in each row may be reduced, so that the display panel 100 may have a loose wiring space, thereby simplifying the circuit and being beneficial to achieving high resolution of the display panel 100.

In addition, as shown in FIG. 34, the display panel 100 may further include a gate driver circuit disposed on a side of the substrate 10 and located in the peripheral area BB. The gate driver circuit includes a plurality of shift register circuits RS that are cascaded. Each shift register circuit RS is electrically connected to a row of pixel circuits 30.

For example, as shown in FIGS. 27, 29 and 34, each shift register circuit RS is coupled to a first signal line L1, a second signal line L2 and a third signal line L3, that is, each shift register circuit RS is coupled to first enable signal terminals EM1, second enable signal terminals EM2 and control signal terminals CK of pixel circuits 30 in a row, and is configured to transmit the first enable signal, the second enable signal and the control signal to the coupled pixel circuits 30.

The transistors used in the pixel circuit 30 provided in the embodiments of the present disclosure may be thin film transistors (TFTs), field effect transistors (e.g., metal oxide semiconductor (MOS) transistors), or other switching devices with the same characteristics.

For example, the transistors used in the pixel circuit 30 are all silicon-based field effect transistors. That is, the first transistor T1, the second transistor T2, the third transistor T3, the fourth transistor T4, the fifth transistor T5, the sixth transistor T6, the seventh transistor T7, the eighth transistor T8, the ninth transistor T9, the tenth transistor T10, the eleventh transistor T11, the twelfth transistor T12, the thirteenth transistor T13, the fourteenth transistor T14, the fifteenth transistor T15, the sixteenth transistor T16, the seventeenth transistor T17, the eighteenth transistor T18 and the nineteenth transistor T19 are all silicon-based field effect transistors.

The silicon-based field effect transistor may also be called a silicon-based transistor. The silicon-based field effect transistor includes a silicon substrate, a thin film microbridge and at least one thin film transistor. The silicon substrate includes at least one microcavity, and each microcavity makes a thin film microbridge located on the microcavity suspended. The thin film microbridge is provided above the silicon substrate, and the thin film transistor is provided on a central area of each thin film microbridge. The silicon-based transistor, compared with a glass-based thin film transistor, has the following advantages.

A size of the silicon-based transistor is in a range of tens to hundreds of nanometers, and a size of the glass-based thin film transistor is in a range of several microns to tens of microns. The small size of the silicon-based transistor is conducive to reducing the area occupied by the pixel circuit 30, thereby increasing the pixel density and achieving rather high PPI display.

A conduction time of the silicon-based transistor is tens of picoseconds, and a conduction time of the glass-based thin film transistor is in a range of tens to hundreds of nanoseconds. The conduction time of the silicon-based transistor is short.

A stability of the silicon-based transistor is higher than that of the transistor formed on the glass substrate. A pixel circuit composed of glass-based transistors does not need to perform compensation on the threshold voltage, which is conducive to simplifying the pixel circuit 30 and reducing the area occupied by the pixel circuit 30, thereby increasing the pixel density and achieving rather high PPI display.

FIG. 30 is a timing diagram of the pixel circuit shown in FIG. 24. The pixel circuit shown in FIG. 24 will be exemplarily described below within a frame with reference to FIG. 30.

A frame period at least includes a data writing phase P1 and a light emission phase P2. A voltage of the first constant voltage signal received at the first constant voltage signal terminal VC1 is at a high level, and a voltage of the second constant voltage signal received at the second constant voltage signal terminal VC2 is at a low level.

In the data writing phase P1, the first scan signal received at the first scan signal terminal G1 is at a low level, and the second scan signal received at the second scan signal terminal G2 and the control signal received at the control signal terminal CK are both at high levels. The voltages of the first enable signal received at the first enable signal terminal EM1 and the second enable signal received at the second enable signal terminal EM2 are both at high levels.

On this basis, the fifth transistor T5 and the sixth transistor T6 are turned on to write the grayscale data signal into the second node N2, and the voltage at the second node N2 is stored by the first capacitor C1. The seventh transistor T7 is turned on to transmit the reset signal received at the reset signal terminal Rst to the fourth node N4 to reset the first electrode of the light-emitting device 20. The fourteenth transistor T14 is turned on to write the control data signal into the fifth node N5 and the sixth node N6, and the voltages at the fifth node N5 and the sixth node N6 are stored by the fourth capacitor C4.

In a case where the target grayscale is greater than the first grayscale, the voltage of the control data signal is at a low level, the tenth transistor T10 is turned on, and the eleventh transistor T11 is turned off. The first enable signal received at the first enable signal terminal EM1 is transmitted to the first node N1, and the voltage at the first node N1 is at a high level. The first transistor T1 is turned off, and the second transistor T2 is turned on. The second constant voltage signal received at the second constant voltage signal terminal VC2 is transmitted to the enable signal control terminal EK, and the fourth transistor T4 is turned off.

In a case where the target grayscale is less than or equal to the first grayscale, the voltage of the control data signal is at a high level, the tenth transistor T10 is turned off, and the eleventh transistor T11 is turned on. The second enable signal received at the second enable signal terminal EM2 is transmitted to the first node N1, and the voltage at the first node N1 is at a high level. The first transistor T1 is turned off, and the second transistor T2 is turned on. The second constant voltage signal received at the second constant voltage signal terminal VC2 is transmitted to the enable signal control terminal EK, and the fourth transistor T4 is turned off.

In the light emission phase P2, the first scan signal received at the first scan signal terminal G1 is at a high level, and the second scan signal of the second scan signal terminal G2 and the control signal received at the control signal terminal CK are both at low levels. The first enable signal received at the first enable signal terminal EM1 is at a low level, and the second enable signal received at the second enable signal terminal EM2 is a pulse signal, that is, the voltage of the second enable signal alternates between a low level and a high level.

On this basis, the fifth transistor T5, the sixth transistor T6, the seventh transistor T7 and the fourteenth transistor T14 are turned off. Under control of the grayscale data signal of the second node N2 stored in the first capacitor C1, the third transistor T3 is turned on.

In a case where the target grayscale is greater than the first grayscale, under control of the control data signal at the fifth node N5 and the sixth node N6 stored in the fourth capacitor C4, the tenth transistor T10 is turned on and the eleventh transistor T11 is turned off. The first enable signal received at the first enable signal terminal EM1 is transmitted to the first node N1, and the voltage at the first node N1 is at a low level. The first transistor T1 is turned on, and the second transistor T2 is turned off. The first constant voltage signal received at the first constant voltage signal terminal VC1 is transmitted to the enable signal control terminal EK, and the fourth Transistor T4 is turned on.

That is to say, in the light emission phase P2, in a case where the target grayscale is greater than the first grayscale, the light-emitting device 20 receives the driving current signal continuously and emits light continuously.

In a case where the target grayscale is less than or equal to the first grayscale, under control of the control data signal at the fifth node N5 and the sixth node N6 stored in the fourth capacitor C4, the tenth transistor T10 is turned off and the eleventh transistor T11 is turned on. The second enable signal received at the second enable signal terminal EM2 is transmitted to the first node N1, and the voltage at the first node N1 alternates between a low level and a high level.

In a case where the voltage at the first node N1 is at a low level, the first transistor T1 is turned on, and the second transistor T2 is turned off. The first constant voltage signal received at the first constant voltage signal terminal VC1 is transmitted to the enable signal control terminal EK, and the fourth Transistor T4 is turned on. In a case where the voltage at the first node N1 is at a high level, the first transistor T1 is turned off, and the second transistor T2 is turned on. The second constant voltage signal received at the second constant voltage signal terminal VC2 is transmitted to the enable signal control terminal EK, and the four transistor T4 is turned off.

That is to say, in the light emission phase P2, in a case where the target grayscale is less than or equal to the first grayscale, the light-emitting device 20 receives the driving current signal intermittently and emits light intermittently.

Figure 35:
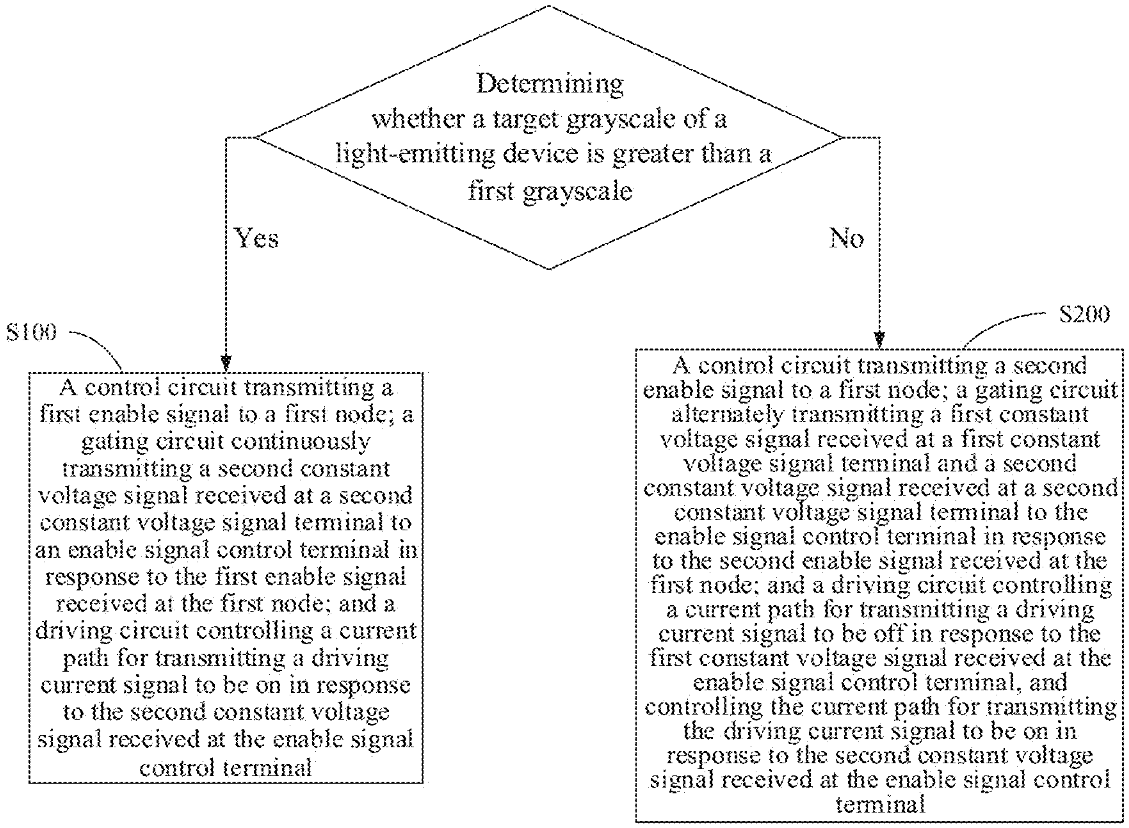
FIG. 35 is a flow diagram of a driving method for a pixel circuit, in accordance with some embodiments.

Some embodiments of the present disclosure further provide a driving method for a pixel circuit, which is applied to the pixel circuit in any of the above embodiments. Referring to FIG. 35, the driving method includes following steps.

In the light emission phase P2 (referring to FIG. 30), it is determined whether a target grayscale of a light-emitting device 20 driven by a pixel circuit 30 is greater than a first grayscale. In a case where the target grayscale of the light-emitting device 20 driven by the pixel circuit 30 is greater than the first grayscale, S100 is performed; and in a case where the target grayscale of the light-emitting device 20 driven by the pixel circuit 30 is less than or equal to the first grayscale, S200 is performed.

In S100, a control circuit 32 transmits a first enable signal to a first node N1; a gating circuit 33 continuously transmits a second constant voltage signal received at a second constant voltage signal terminal VC2 to an enable signal control terminal EK in response to the first enable signal received at the first node N1; and a driving circuit 31 controls a current path for transmitting a driving current signal to be on to drive the light-emitting device 20 to continuously emit light in response to the second constant voltage signal received at the enable signal control terminal EK.

In S200, the control circuit 32 transmits a second enable signal to the first node N1; the gating circuit 33 alternately transmits a first constant voltage signal received at a first constant voltage signal terminal VC1 and the second constant voltage signal received at the second constant voltage signal terminal VC2 to the enable signal control terminal EK in response to the second enable signal received at the first node N1; and the driving circuit 31 controls the current path for transmitting the driving current signal to be off in response to the first constant voltage signal received at the enable signal control terminal EK, and controls the current path for transmitting the driving current signal to be on in response to the second constant voltage signal received at the enable signal control terminal EK, so as to drive the light-emitting device 20 to emit light intermittently.

Beneficial effects of the driving method for the above pixel circuit are the same as the beneficial effects of the pixel circuit in some of the above embodiments, and details are not repeated here.

In another aspect, some embodiments of the present disclosure further provide a computer-readable storage medium. The computer-readable storage medium has stored computer program instructions thereon that, when run on a processor, enable the processor to perform one or more steps of the driving method for the pixel circuit in any of the above embodiments.

For example, the computer-readable storage medium includes, but is not limited to, a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM), a card, a stick or a key driver). Various computer-readable storage media described in the present disclosure may represent one or more devices and/or other machine-readable storage media, which are used for storing information. The term "machine-readable storage media" may include, but is not limited to, wireless channels and various other media capable of storing, containing and/or carrying instructions and/or data.

In yet another aspect, some embodiments of the present disclosure further provide a computer program product. The computer program product includes computer program instructions that, when executed by a computer, enable the computer to perform one or more steps of the driving method for the pixel circuit in any of the above embodiments.

In yet another aspect, some embodiments of the present disclosure further provide a computer program. The computer program, when executed by a computer, enables the computer to perform one or more steps of the driving method for the pixel circuit in any of the above embodiments.

Beneficial effects of the computer-readable storage medium, the computer program product and the computer program are the same as the beneficial effects of the driving method for the pixel circuit in some of the above embodiments, and details are not repeated here.

In the description of the specification, the specific features, structures, materials or characteristics may be included in any one or more embodiments or examples in any suitable manner.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel circuit, comprising:

a driving circuit coupled to a grayscale data signal terminal, a scan signal terminal, a first power supply voltage terminal, an enable signal control terminal and a light-emitting device; the driving circuit being configured to control on and off of a current path for transmitting a driving current signal under control of a scan signal received at the scan signal terminal and a signal received at the enable signal control terminal;

a control circuit coupled to a control signal terminal, a first node, a first enable signal terminal and a second enable signal terminal; the control circuit being configured to transmit a first enable signal received at the first enable signal terminal or a second enable signal received at the second enable signal terminal to the first node under control of a control signal received at the control signal terminal; and a gating circuit coupled to the enable signal control terminal, the first node, a first constant voltage signal terminal and a second constant voltage signal terminal; the gating circuit being configured to, in response to an enable signal received at the first node, transmit a first constant voltage signal received at the first constant voltage signal terminal or a second constant voltage signal received at the second constant voltage signal terminal to the enable signal control terminal.

2. The pixel circuit according to claim 1, wherein the gating circuit includes:

a first output sub-circuit coupled to the enable signal control terminal, the first node and the first constant voltage signal terminal; the first output sub-circuit being configured to, in response to the enable signal received at the first node, transmit the first constant voltage signal received at the first constant voltage signal terminal to the enable signal control terminal; and a second output sub-circuit coupled to the enable signal control terminal, the first node and the second constant voltage signal terminal; the second output sub-circuit being configured to, in response to the enable signal received at the first node, transmit the second constant voltage signal received at the second constant voltage signal terminal to the enable signal control terminal.

3. The pixel circuit according to claim 2, wherein the first output sub-circuit includes: a first transistor, wherein a first electrode of the first transistor is coupled to the first constant voltage signal terminal, a second electrode of the first transistor is coupled to the enable signal control terminal, and a control electrode of the first transistor is coupled to the first node; and the second output sub-circuit includes: a second transistor having an inverse conduction type to the first transistor, wherein a first electrode of the second transistor is coupled to the second constant voltage signal terminal, a second electrode of the second transistor is coupled to the enable signal control terminal, and a control electrode of the second transistor is coupled to the first node;

or the first output sub-circuit includes: a first transistor, wherein a first electrode of the first transistor is coupled to the first constant voltage signal terminal, a second electrode of the first transistor is coupled to the enable signal control terminal, and a control electrode of the first transistor is coupled to the first node; and the second output sub-circuit includes: a second transistor having an inverse conduction type to the first transistor, wherein a first electrode of the second transistor is coupled to the second constant voltage signal terminal, a second electrode of the second transistor is coupled to the enable signal control terminal, and a control electrode of the second transistor is coupled to the first node; wherein the first constant voltage signal received at the first constant voltage signal terminal is greater than the second constant voltage signal received at the second constant voltage signal terminal; the first transistor is a P-type transistor, and the second transistor is an N-type transistor.

4. The pixel circuit according to claim 1, wherein the driving circuit includes:

a data writing sub-circuit coupled to the grayscale data signal terminal, the scan signal terminal and a second node; the data writing sub-circuit being configured to transmit a grayscale data signal received at the grayscale data signal terminal to the second node in response to the scan signal received at the scan signal terminal; and a driving signal generation sub-circuit coupled to the second node, the first power supply voltage terminal, the enable signal control terminal and the light-emitting device; the driving signal generation sub-circuit being configured to generate the driving current signal based on a voltage at the second node and a first voltage signal received at the first power supply voltage terminal, and control the on and off of the current path for transmitting the driving current signal in response to the signal received at the enable signal control terminal.

5. The pixel circuit according to claim 4, wherein the driving signal generation sub-circuit includes:

a third transistor, wherein a first electrode of the third transistor is coupled to a third node, a second electrode of the third transistor is coupled to a fourth node, and a control electrode of the third transistor is coupled to the second node; the fourth node is further coupled to a first electrode of the light-emitting device, and a second electrode of the light-emitting device is coupled to a second power supply voltage terminal; and a fourth transistor, wherein a first electrode of the fourth transistor is coupled to the first power supply voltage terminal, a second electrode of the fourth transistor is coupled to the third node, and a control electrode of the fourth transistor is coupled to the enable signal control terminal.

6. The pixel circuit according to claim 4, wherein the data writing sub-circuit is further coupled to a reference voltage terminal, and the scan signal terminal includes a first scan signal terminal and a second scan signal terminal;

the data writing sub-circuit includes:

a fifth transistor, wherein a first electrode of the fifth transistor is coupled to the grayscale data signal terminal, a second electrode of the fifth transistor is coupled to the second node, and a control electrode of the fifth transistor is coupled to the first scan signal terminal;

a sixth transistor having an inverse conduction type to the fifth transistor, wherein a first electrode of the sixth transistor is coupled to the grayscale data signal terminal, a second electrode of the sixth transistor is coupled to the second node, and a control electrode of the sixth transistor is coupled to the second scan signal terminal; and a first capacitor, wherein a first electrode plate of the first capacitor is coupled to the second node, and a second electrode plate of the first capacitor is coupled to a reference voltage terminal.

7. The pixel circuit according to claim 4, wherein the driving circuit further includes:

a reset sub-circuit coupled to the scan signal terminal, a fourth node and a reset signal terminal; the reset sub-circuit being configured to, in response to the scan signal received at the scan signal terminal, transmit a reset signal received at the reset signal terminal to the fourth node; or the driving circuit further includes:

a reset sub-circuit coupled to the scan signal terminal, a fourth node and a reset signal terminal; the reset sub-circuit being configured to, in response to the scan signal received at the scan signal terminal, transmit a reset signal received at the reset signal terminal to the fourth node; and the reset sub-circuit including a seventh transistor, wherein a first electrode of the seventh transistor is coupled to the reset signal terminal, a second electrode of the seventh transistor is coupled to the fourth node, and a control electrode of the seventh transistor is coupled to the scan signal terminal.

8. The pixel circuit according to claim 4, wherein the data writing sub-circuit is further coupled to a reset signal terminal; and the data writing sub-circuit includes:

an eighth transistor, wherein a first electrode of the eighth transistor is coupled to the grayscale data signal terminal, a second electrode of the eighth transistor is coupled to the second node, and a control electrode of the eighth transistor is coupled to the scan signal terminal;

a ninth transistor having a same conduction type as the eighth transistor, wherein a first electrode of the ninth transistor is coupled to the reset signal terminal, a second electrode of the ninth transistor is coupled to a fourth node, and a control electrode of the ninth transistor is coupled to the scan signal terminal; and a first capacitor, wherein a first electrode plate of the first capacitor is coupled to the second node, and a second electrode plate of the first capacitor is coupled to the fourth node.

9. The pixel circuit according to claim 1, wherein the control circuit includes:

a first enable sub-circuit coupled to a fifth node, the first enable signal terminal and the first node; the first enable sub-circuit being configured to transmit the first enable signal received at the first enable signal terminal to the first node in response to a signal received at the fifth node; and a second enable sub-circuit coupled to a sixth node, the second enable signal terminal and the first node; the second enable sub-circuit being configured to transmit the second enable signal received at the second enable signal terminal to the enable signal control terminal in response to a signal received at the sixth node.

10. The pixel circuit according to claim 9, wherein the first enable sub-circuit includes:

a tenth transistor, wherein a first electrode of the tenth transistor is coupled to the first enable signal terminal, a second electrode of the tenth transistor is coupled to the first node, and a control electrode of the tenth transistor is coupled to the fifth node; and the second enable sub-circuit includes:

an eleventh transistor, wherein a first electrode of the eleventh transistor is coupled to the second enable signal terminal, a second electrode of the eleventh transistor is coupled to the first node, and a control electrode of the eleventh transistor is coupled to the sixth node.

11. The pixel circuit according to claim 9, wherein the control circuit further includes:

a first enable control sub-circuit coupled to a control data signal terminal, the control signal terminal, the fifth node and the sixth node; the first enable control sub-circuit being configured to transmit a control data signal received at the control data signal terminal to the fifth node and the sixth node in response to the control signal received at the control signal terminal; and a storage sub-circuit coupled to a voltage signal terminal, the fifth node and the sixth node; the storage sub-circuit being configured to receive and store control data signals at the fifth node and the sixth node.

12. The pixel circuit according to claim 11, wherein transistors included in the first enable sub-circuit and the second enable sub-circuit have a same conduction type; the control signal terminal includes a first control signal terminal and a second control signal terminal; and the voltage signal terminal includes a first voltage signal terminal and a second voltage signal terminal;

the first enable control sub-circuit includes:

a first sub-circuit coupled to the fifth node, the first control signal terminal and a first control data signal terminal; the first sub-circuit being configured to transmit a first control data signal received at the first control data signal terminal to the fifth node in response to a first control signal received at the first control signal terminal; and a second sub-circuit coupled to the sixth node, the second control signal terminal and a second control data signal terminal; the second sub-circuit being configured to transmit a second control data signal received at the second control data signal terminal to the sixth node in response to a second control signal received at the second control signal terminal; and the storage sub-circuit includes:

a first storage sub-circuit coupled to the first voltage signal terminal and the fifth node; the first storage sub-circuit being configured to receive and store the first control data signal at the fifth node; and a second storage sub-circuit coupled to the second voltage signal terminal and the sixth node; the second storage sub-circuit being configured to receive and store the second control data signal at the sixth node.

13. The pixel circuit according to claim 12, wherein the first sub-circuit includes:

a twelfth transistor, wherein a first electrode of the twelfth transistor is coupled to the first control data signal terminal, a second electrode of the twelfth transistor is coupled to the fifth node, and a control electrode of the twelfth transistor is coupled to the first control signal terminal;

the second sub-circuit includes:

a thirteenth transistor, wherein a first electrode of the thirteenth transistor is coupled to the second control data signal terminal, a second electrode of the thirteenth transistor is coupled to the sixth node, and a control electrode of the thirteenth transistor is coupled to the second control signal terminal;

the first storage sub-circuit includes:

a second capacitor, wherein a first electrode plate of the second capacitor is coupled to the fifth node, and a second electrode plate of the second capacitor is coupled to the first voltage signal terminal; and the second storage sub-circuit includes:

a third capacitor, wherein a first electrode plate of the third capacitor is coupled to the sixth node, and a second electrode plate of the third capacitor is coupled to the second voltage signal terminal.

14. The pixel circuit according to claim 11, wherein transistors included in the first enable sub-circuit and the second enable sub-circuit have inverse conduction types;

the first enable control sub-circuit includes:

a fourteenth transistor, wherein a first electrode of the fourteenth transistor is coupled to a control data signal terminal, a second electrode of the fourteenth transistor is coupled to both the fifth node and the sixth node, and a control electrode of the fourteenth transistor is coupled to the control signal terminal; and the storage sub-circuit includes:

a fourth capacitor, wherein a first electrode plate of the fourth capacitor is coupled to the fifth node and the sixth node, and a second electrode plate of the fourth capacitor is coupled to the voltage signal terminal.

15. The pixel circuit according to claim 9, wherein the control circuit further includes:

a second enable control sub-circuit coupled to a control data signal terminal, the control signal terminal and the sixth node; the second enable control sub-circuit being configured to transmit a control data signal received at the control data signal terminal to the sixth node in response to the control signal received at the control signal terminal; and a signal latch sub-circuit coupled to a third constant voltage terminal, a fourth constant voltage terminal, a fifth constant voltage terminal, the fifth node and the sixth node; the signal latch sub-circuit being configured to, in response to a voltage at the sixth node, transmit a fourth constant voltage signal received at the fourth constant voltage terminal or a fifth constant voltage signal received at the fifth constant voltage terminal to the fifth node.

16. The pixel circuit according to claim 15, wherein the second enable control sub-circuit includes:

a fifteenth transistor, wherein a first electrode of the fifteenth transistor is coupled to the control data signal terminal, a second electrode of the fifteenth transistor is coupled to the sixth node, and a control electrode of the fifteenth transistor is coupled to the control signal terminal; and the signal latch sub-circuit includes:

a sixteenth transistor, wherein a first electrode of the sixteenth transistor is coupled to the third constant voltage terminal, a second electrode of the sixteenth transistor is coupled to the sixth node, and a control electrode of the sixteenth transistor is coupled to the fifth node;

a seventeenth transistor having an inverse conduction type to the sixteenth transistor, wherein a first electrode of the seventeenth transistor is coupled to the sixth node, a second electrode of the seventeenth transistor is coupled to the fifth constant voltage terminal, and a control electrode of the seventeenth transistor is coupled to the fifth node;

an eighteenth transistor, wherein a first electrode of the eighteenth transistor is coupled to the fifth constant voltage terminal, a second electrode of the eighteenth transistor is coupled to the fifth node, and a control electrode of the eighteenth transistor is coupled to the sixth node; and a nineteenth transistor having an inverse conduction type to the eighteenth transistor, wherein a first electrode of the nineteenth transistor is coupled to the fourth constant voltage terminal, a second electrode of the nineteenth transistor is coupled to the fifth node, and a control electrode of the nineteenth transistor is coupled to the sixth node.

17. A display panel, comprising:

the pixel circuit according to claim 1; and a light-emitting device coupled to the pixel circuit.

18. The display panel according to claim 17, further comprising:

a plurality of shift register circuits that are cascaded, wherein each shift register circuit is coupled to second enable signal terminals of pixel circuits in a row; and the shift register circuit is configured to transmit the second enable signal to the second enable signal terminals of the pixel circuits couple thereto.

19. A display device, comprising:

the display panel according to claim 17; and a driver chip, wherein the driver chip is coupled to the display panel, and the driver chip is configured to provide signals to the display panel.

20. A driving method for a pixel circuit applied to the pixel circuit according to claim 1, the pixel circuit including the driving circuit, the control circuit and the gating circuit; and the driving method for the pixel circuit comprising:

in a light emission phase and in a case where a target grayscale of the light-emitting device driven by the pixel circuit is greater than a first grayscale, the control circuit transmitting the first enable signal to the first node; the gating circuit continuously transmitting the second constant voltage signal received at the second constant voltage signal terminal to the enable signal control terminal in response to the first enable signal received at the first node; and the driving circuit controlling the current path for transmitting the driving current signal to be on to drive the light-emitting device to continuously emit light in response to the second constant voltage signal received at the enable signal control terminal; and in the light emission phase and in a case where the target grayscale of the light-emitting device driven by the pixel circuit is less than or equal to the first grayscale, the control circuit transmitting the second enable signal to the first node; the gating circuit alternately transmitting the first constant voltage signal received at the first constant voltage signal terminal and the second constant voltage signal received at the second constant voltage signal terminal to the enable signal control terminal in response to the second enable signal received at the first node; and the driving circuit controlling the current path for transmitting the driving current signal to be off in response to the first constant voltage signal received at the enable signal control terminal, and controlling the current path for transmitting the driving current signal to be on in response to the second constant voltage signal received at the enable signal control terminal, so as to drive the light-emitting device to emit light intermittently.

* * * * *